US011785900B2

(12) United States Patent
Crawford et al.

(10) Patent No.: US 11,785,900 B2
(45) Date of Patent: Oct. 17, 2023

(54) FORESTRY MACHINE

(71) Applicant: TimberPro, Inc., Shawano, WI (US)

(72) Inventors: Lee Crawford, Shawano, WI (US); John Lambert, Clintonville, WI (US)

(73) Assignee: TIMBERPRO, INC., Shawano, WI (US)

( * ) Notice: Subject to any disclaimer, the term of this patent is extended or adjusted under 35 U.S.C. 154(b) by 473 days.

(21) Appl. No.: 17/002,121

(22) Filed: Aug. 25, 2020

(65) Prior Publication Data

US 2021/0059131 A1 Mar. 4, 2021

Related U.S. Application Data

(60) Provisional application No. 62/895,794, filed on Sep. 4, 2019.

(51) Int. Cl.
*A01G 23/00* (2006.01)
*B25J 5/06* (2006.01)
(Continued)

(52) U.S. Cl.
CPC ............ *A01G 23/006* (2013.01); *B25J 5/007* (2013.01); *B25J 5/06* (2013.01); *B60K 5/00* (2013.01);
(Continued)

(58) Field of Classification Search
CPC ..... A01G 23/006; A01G 23/003; B25J 5/007; B25J 5/06; B60K 5/00; B60K 11/00;
(Continued)

(56) References Cited

U.S. PATENT DOCUMENTS 2,852,149 A * 9/1958 Bruneri .................. E02F 9/121
212/247
3,034,670 A * 5/1962 Lafian ..................... E02F 9/166
212/247

(Continued)

FOREIGN PATENT DOCUMENTS

FI 112158 B 11/2003
SE 522277 C2 * 1/2004 .......... A01G 23/003
(Continued)

OTHER PUBLICATIONS

The Office Action for the corresponding Finnish patent application No. 20205859, dated Sep. 13, 2021.
(Continued)

*Primary Examiner* — James A Shriver, II
*Assistant Examiner* — Michael T. Walsh
(74) *Attorney, Agent, or Firm* — Global IP Counselors, LLP

(57) ABSTRACT

A forestry machine includes a ground propulsion apparatus, a chassis supported by the ground propulsion apparatus, a cab, an engine and a work implement. The chassis includes a front chassis portion and a rear chassis portion. The front chassis portion includes an upper portion and a lower portion. The rear chassis portion has a wood basket supported thereon. The cab is rotatably supported on the front chassis portion by a rotatable connection about a cab rotation axis to be selectively rotated 360 degrees. The engine is integrated into the front chassis portion. At least a part of the engine is disposed below an upper most surface of the upper portion. The work implement is movably attached to the cab. The work implement includes a boom movably attached to the cab, an arm movably attached to the boom, and a work tool attached to the arm.

11 Claims, 17 Drawing Sheets

(51) Int. Cl.
  *B25J 5/00*    (2006.01)
  *B62D 21/02*   (2006.01)
  *B60P 3/41*    (2006.01)
  *B60K 11/00*   (2006.01)
  *B60P 1/54*    (2006.01)
  *B60K 5/00*    (2006.01)
  *B60R 19/24*   (2006.01)
  *B60K 17/06*   (2006.01)
  *B62D 33/06*   (2006.01)

(52) U.S. Cl.
  CPC ............. *B60K 11/00* (2013.01); *B60K 17/06* (2013.01); *B60P 1/54* (2013.01); *B60P 3/41* (2013.01); *B60R 19/24* (2013.01); *B62D 21/02* (2013.01); *B62D 33/06* (2013.01)

(58) Field of Classification Search
  CPC ... B60K 17/06; B60P 1/54; B60P 3/41; B60R 19/24; B62D 21/02; B62D 33/06; B60Y 2200/22; B60Y 2200/222; B60Y 2200/41
  See application file for complete search history.

(56) References Cited

U.S. PATENT DOCUMENTS

| | | | | |
|---|---|---|---|---|
| 4,102,461 | A * | 7/1978 | Soyland | B60K 5/00 212/253 |
| 4,540,032 | A * | 9/1985 | Pelletier | A01G 23/003 144/24.13 |
| 6,179,353 | B1 * | 1/2001 | Heatherington | B60R 19/18 293/154 |
| 6,669,272 | B2 * | 12/2003 | Ayabe | B60J 5/0487 296/190.08 |
| 6,779,570 | B2 * | 8/2004 | Tardif | A01G 23/003 144/34.1 |
| 6,817,433 | B1 * | 11/2004 | Bergstrom | B62D 25/105 180/89.12 |
| 8,944,493 | B2 * | 2/2015 | Kimura | B62D 33/06 296/190.09 |
| 9,114,696 | B2 * | 8/2015 | Osara | B60L 7/02 |
| 9,510,522 | B2 | 12/2016 | Yrjana et al. | |
| 10,246,148 | B2 * | 4/2019 | Einola | B62D 55/12 |
| 2007/0145759 | A1 | 6/2007 | Crawford et al. | |
| 2013/0214928 | A1 * | 8/2013 | Kuittinen | E21B 7/025 175/57 |
| 2023/0021486 | A1 * | 1/2023 | Tan | G06V 10/25 |
| 2023/0026910 | A1 * | 1/2023 | Meyer | B25J 15/0019 |
| 2023/0150112 | A1 * | 5/2023 | Morioka | B25J 13/085 180/6.48 |

FOREIGN PATENT DOCUMENTS

| | | | | |
|---|---|---|---|---|
| WO | WO-9817099 | A1 * | 4/1998 | ............. A01G 23/08 |
| WO | WO-0136312 | A1 * | 5/2001 | ............. B66C 23/54 |

OTHER PUBLICATIONS

Search Report for the corresponding Finnish patent application No. 20205859, dated Sep. 13, 2021.

* cited by examiner

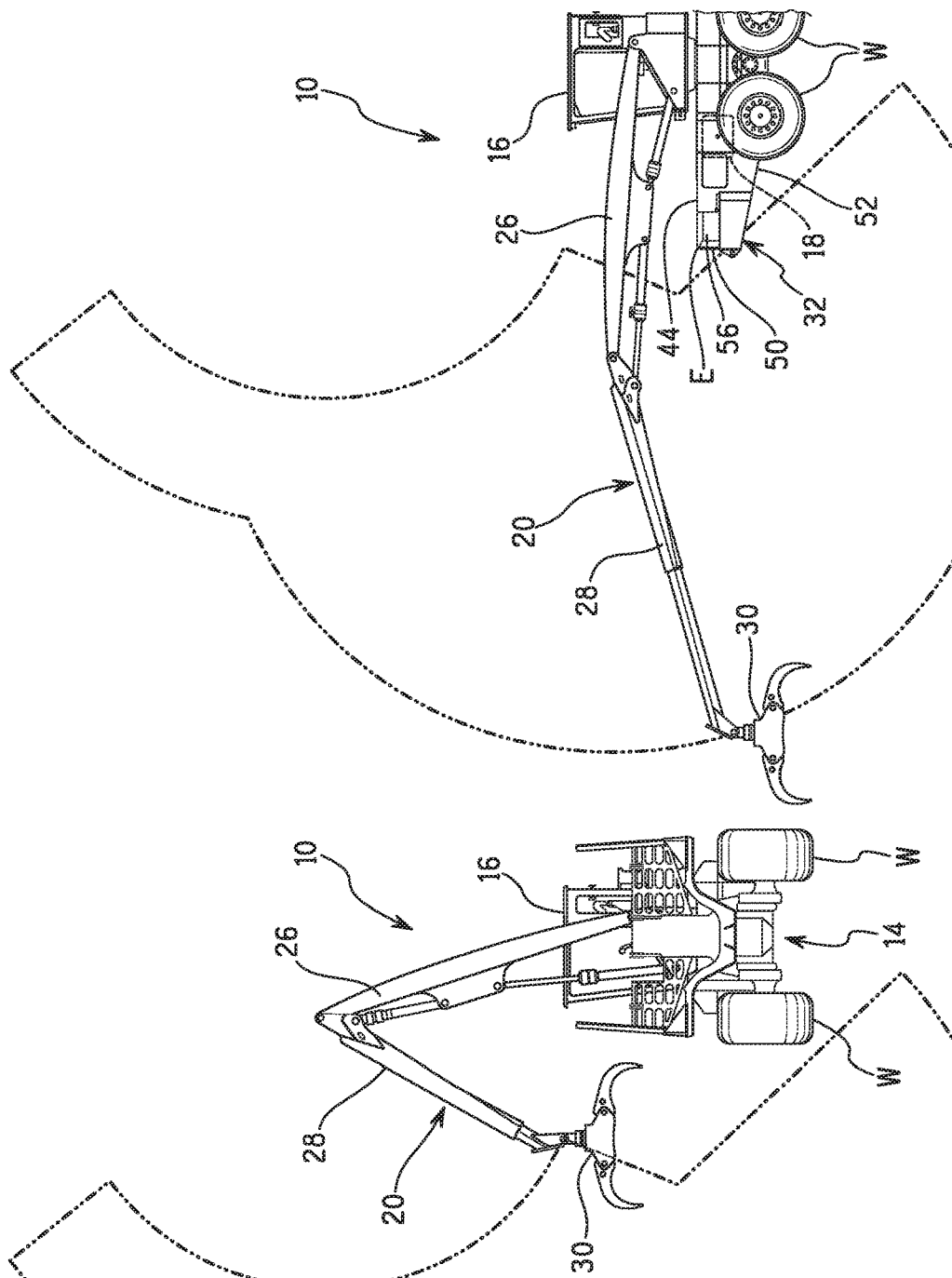

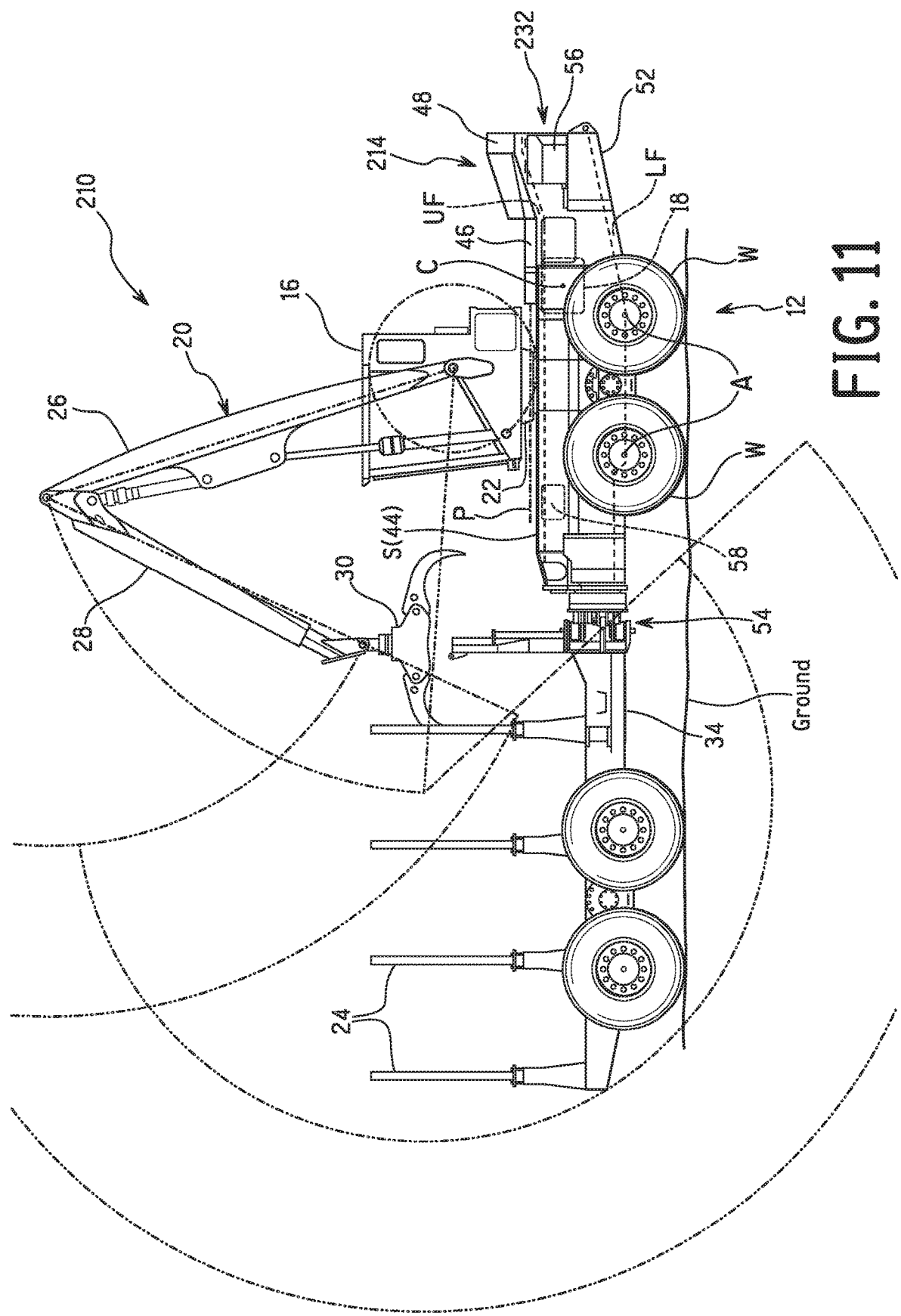

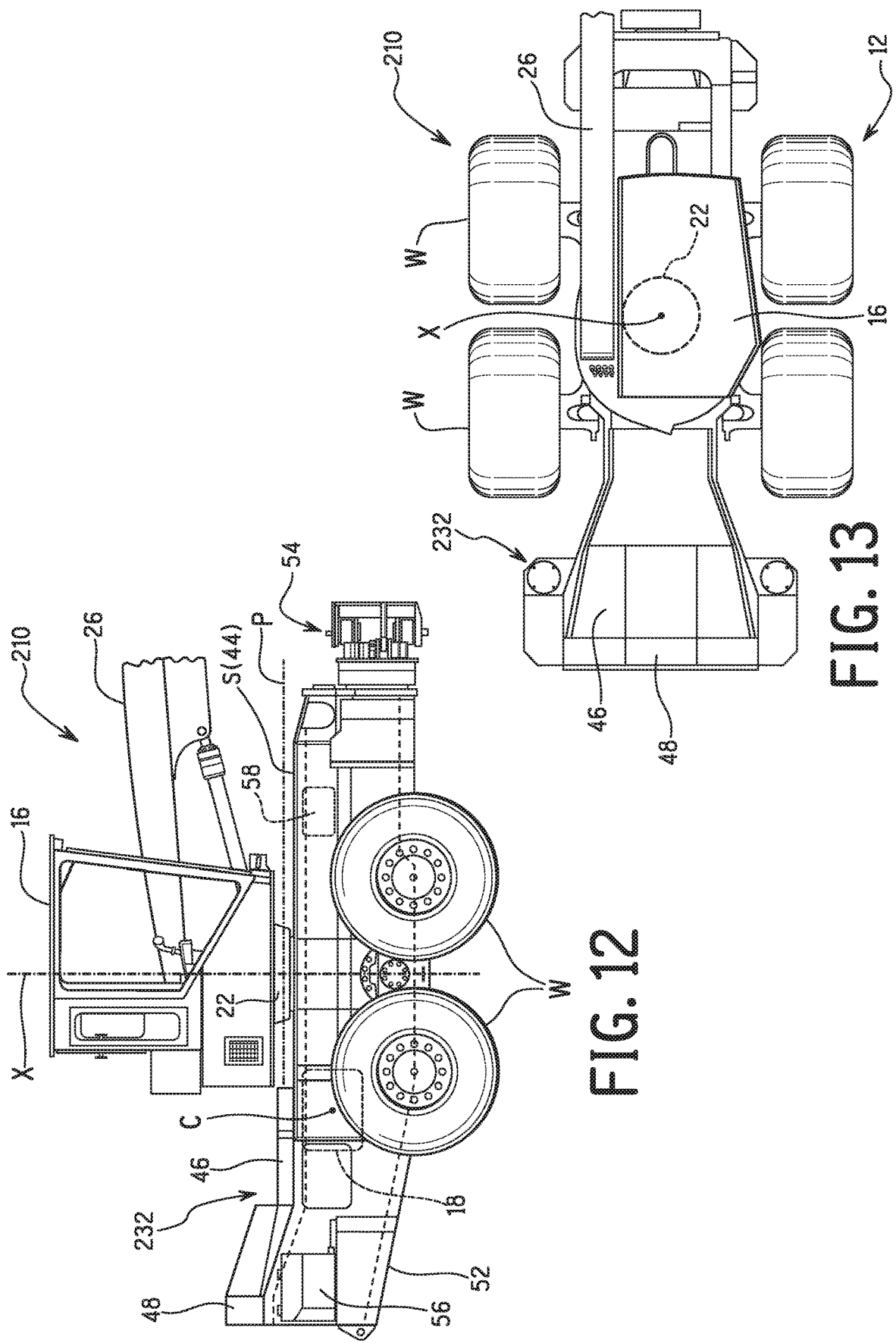

FORESTRY MACHINE

CROSS-REFERENCE TO RELATED APPLICATIONS

This application claims the benefit of U.S. Provisional Application No. 62/895,794 filed Sep. 4, 2019. The entire disclosure of U.S. Provisional Application No. 62/895,794 is hereby incorporated herein by reference.

BACKGROUND

Field of the Invention

The present invention generally relates to a forestry machine. More specifically, the present invention relates to forestry machine, which allows for a cab to be rotatable 360 degrees and has an engine integrated into the front chassis.

Background Information

A work vehicle is a machine used in construction, mining, forestry, farming, etc. Such work vehicles typically have at least one work implement coupled to the vehicle body and/or chassis. The work implement is often movable but can be stationary in some cases. Such work vehicles include a ground propulsion apparatus that uses tracks or wheels to propel and/or steer the work vehicle. The tracks or wheels also serve to support the main body of the work vehicle. Some examples of a work vehicle include a bulldozer, a dump truck, a front end loader, a backhoe, an excavator, a loader, a forwarder and a feller buncher or harvester.

SUMMARY

It has been discovered that forestry machines typically have limited rotation travel of the cab and/or work implement (i.e., the cab and/or work implement do not rotate a full 360 degrees) due to interference from other parts such as engine parts.

Therefore, one object of the present invention is to provide a forestry machine with a cab and work implement that rotate and operate within a full 360 degrees without interference from other parts such as engine parts.

It has been further discovered that some forestry machines have difficulty working off the front of the machine due to visibility and/or interference from other parts.

Therefore, another object of the present invention is to provide a forestry machine which facilitates work off the front of the machine.

It has been further discovered that some forestry machines do not always have a center of gravity that is as low as desired for working in rough and uneven terrain (e.g., where there are slopes, rocks, stumps and/or debris).

Therefore, yet another object of the present invention is to provide a forestry machine which has a relatively low center of gravity.

It has been further discovered that forestry machines typically include a separate counterweight making the machine more complicated (more parts) and heavier than may be desired.

Therefore, yet another object of the present invention is to provide a forestry machine which uses other structure of the machine to act as a counterweight so the machine can be relatively lightweight.

With a forestry machine in accordance with one or more of the above objects, if there is a wet spot in the skid travel trail, the operator can grab brush from the forest floor and mat the trail. In addition, a forestry machine in accordance with one or more of the above objects will also allow the forestry machine to be used as a combination machine, e.g., a forwarder and harvester. Finally, a forestry machine in accordance with one or more of the above objects has advantages in working on steep slopes.

In view of the state of the known technology and in accordance with a first aspect of the present disclosure, a forestry machine is basically provided that comprises a ground propulsion apparatus, a chassis supported by the ground propulsion apparatus, a cab, an engine and a work implement. The chassis includes a front chassis portion and a rear chassis portion. The front chassis portion includes an upper portion and a lower portion. The rear chassis portion has a wood basket supported thereon. The cab is rotatably supported on the front chassis portion by a rotatable connection about a cab rotation axis to be selectively rotated 360 degrees. The engine is integrated into the front chassis portion in front of the rotatable connection. At least a part of the engine is disposed below an upper most surface of the upper portion. The work implement is movably attached to the cab. The work implement includes a boom movably attached to the cab, an arm movably attached to the boom, and a work tool attached to the arm.

In accordance with a second aspect of the present disclosure, the forestry machine according to the first aspect is configured so that a center of gravity of the engine is disposed below the upper most surface of the upper portion.

In accordance with a third aspect of the present disclosure, the forestry machine according to the first aspect is configured so that a majority of the engine is disposed below the upper most surface of the upper portion.

In accordance with a fourth aspect of the present disclosure, the forestry machine according to the first aspect is configured so that an entirety of the engine is disposed below the upper most surface of the upper portion.

In accordance with a fifth aspect of the present disclosure, the forestry machine according to the fourth aspect is configured so that the entirety of the engine is disposed vertically between the uppermost surface of the upper portion and a lower most surface of the lower portion.

In accordance with a sixth aspect of the present disclosure, the forestry machine according to any of the first to fifth aspects further includes a cooling package disposed in front of the engine with respect to the cab.

In accordance with a seventh aspect of the present disclosure, the forestry machine according to the sixth aspect is configured so that the cooling package is integrated into the front chassis below the cab.

In accordance with an eighth aspect of the present disclosure, the forestry machine according to the first aspect is configured so that the engine is disposed below the cab.

In accordance with a ninth aspect of the present disclosure, the forestry machine according to the first aspect further includes a bumper mounted to an upper surface at a front end of the front chassis portion with respect to the cab.

In accordance with a tenth aspect of the present disclosure, the forestry machine according to the first aspect is configured so that the engine is disposed in front of the cab with respect to the rear chassis portion.

In accordance with an eleventh aspect of the present disclosure, the forestry machine according to the first aspect is configured so that the engine is integrated into the front chassis in front of the cab rotation axis.

In accordance with a twelfth aspect of the present disclosure, the forestry machine according to the first aspect further includes a drive gearbox at least partially disposed rearwardly of the cab with respect to the engine.

In accordance with a thirteenth aspect of the present disclosure, the forestry machine according to the first aspect is configured so that an uppermost and forwardmost edge of the forestry machine is disposed at a height so that the work tool of the work implement is movable into contact with ground below the forestry machine in front of the forestry machine when the work implement is in a fully extended position to forward direction.

In accordance with a fourteenth aspect of the present disclosure, the forestry machine according to the first aspect is configured so that the boom of the work implement is configured to be extendable to be substantially horizontal in front and on both sides of the forestry machine.

In view of the state of the known technology and in accordance with a fifteenth aspect of the present disclosure, a forestry machine is basically provided that comprises a ground propulsion apparatus, a chassis supported by the ground propulsion apparatus, a cab, an engine and a work implement. The chassis includes a front chassis portion and a rear chassis portion. The rear chassis portion supports a wood basket. The cab is rotatably supported on the front chassis portion by a rotatable connection about a cab rotation axis to be selectively rotated 360 degrees. The engine is integrated into the front chassis portion. The engine is disposed below a rotational plane of the rotatable connection. The rotational plane of the rotatable connection passes through the rotatable connection between a bottom of the cab and the front a chassis portion. The work implement is movably attached to the cab. The work implement includes a boom movably attached to the cab, an arm movably attached to the boom, and a work tool attached to the arm.

In accordance with a sixteenth aspect of the present disclosure, the forestry machine according to the fifteenth aspect is configured so that a center of gravity of the engine is disposed below the rotational plane of the rotatable connection.

In view of the state of the known technology and in accordance with a seventeenth aspect of the present disclosure, a forestry machine is basically provided that comprises a ground propulsion apparatus, a chassis supported by the ground propulsion apparatus, a cab, an engine and a work implement. The chassis includes a front chassis portion and a rear chassis portion. The rear chassis portion supports a wood basket. The cab is rotatably supported on the front chassis portion by a rotatable connection about a cab rotation axis to be selectively rotated 360 degrees. The engine is integrated into the front chassis portion. The engine is disposed below a bottom surface of the cab. The rotational plane of the rotatable connection passes through the rotatable connection between a bottom of the cab and the front a chassis portion. The work implement is movably attached to the cab. The work implement includes a boom movably attached to the cab, an arm movably attached to the boom, and a work tool attached to the arm.

In accordance with an eighteenth aspect of the present disclosure, the forestry machine according to the seventeenth aspect is configured so that a center of gravity of the engine is disposed below the bottom surface of the cab.

In accordance with a nineteenth aspect of the present disclosure, the forestry machine according to the seventeenth aspect is configured so that the front chassis has a platform area across a majority thereof with the platform area being disposed below the bottom surface of the cab.

In accordance with a twentieth aspect of the present disclosure, the forestry machine according to the nineteenth aspect is configured so that the platform arear has a substantially flat upper surface.

In accordance with another aspect of the present disclosure, the forestry machine according to one or more of the preceding aspects may be configured so that a majority of the cooling package is disposed below the upper most surface of the upper portion.

In accordance with another aspect of the present disclosure, the forestry machine according to one or more of the preceding aspects may be configured so that an entirety of the cooling package is disposed at or below the upper most surface of the upper portion.

In accordance with another aspect of the present disclosure, the forestry machine according to one or more of the preceding aspects may be configured so that the upper most surface of the upper portion is disposed lower than 6 feet off the ground so as to allow ground level maintenance.

In accordance with another aspect of the present disclosure, the forestry machine according to one or more of the preceding aspects may be configured so that the upper most surface of the upper portion is disposed lower than 5 feet off the ground so as to allow ground level maintenance.

In accordance with another aspect of the present disclosure, the forestry machine according to one or more of the preceding aspects may be configured so that a majority of the engine is disposed below the rotational plane of the rotatable connection.

In accordance with another aspect of the present disclosure, the forestry machine according to one or more of the preceding aspects may be configured so that an entirety of the engine is disposed below the rotational plane of the rotatable connection.

In accordance with another aspect of the present disclosure, the forestry machine according to one or more of the preceding aspects may further include a cooling package disposed in front of the engine with respect to the cab.

In accordance with another aspect of the present disclosure, the forestry machine according to one or more of the preceding aspects may be configured so that the cooling package is integrated into the front chassis below the cab.

In accordance with another aspect of the present disclosure, the forestry machine according to one or more of the preceding aspects may be configured so that a majority of the cooling package is disposed below the rotational plane of the rotatable connection.

In accordance with another aspect of the present disclosure, the forestry machine according to one or more of the preceding aspects may be configured so that an entirety of the cooling package is disposed at or below the rotational plane of the rotatable connection.

In accordance with another aspect of the present disclosure, the forestry machine according to one or more of the preceding aspects may be configured so that the engine extends lower than the cooling package.

In accordance with another aspect of the present disclosure, the forestry machine according to one or more of the preceding aspects may be configured so that the cooling package extends higher than the engine.

In accordance with another aspect of the present disclosure, the forestry machine according to one or more of the preceding aspects may be configured so that the front chassis has an upper surface disposed lower than 6 feet off the ground so as to allow ground level maintenance.

In accordance with another aspect of the present disclosure, the forestry machine according to one or more of the preceding aspects may be configured so that the front chassis has an upper surface disposed lower than 5 feet off the ground so as to allow ground level maintenance.

In accordance with another aspect of the present disclosure, the forestry machine according to one or more of the preceding aspects may further include a bumper mounted to an upper surface at a front end of the front chassis with respect to the cab.

In accordance with another aspect of the present disclosure, the forestry machine according to one or more of the preceding aspects may be configured so that the ground propulsion apparatus includes a plurality of wheels.

In accordance with another aspect of the present disclosure, the forestry machine according to one or more of the preceding aspects may be configured so that the front and rear chassis portions are coupled together by an articulated joint disposed therebetween, and the articulated joint has at least two degrees of freedom including a vertical direction and a pivotal direction around the vertical direction.

In accordance with another aspect of the present disclosure, the forestry machine according to one or more of the preceding aspects may be configured so that the articulated joint is lockable such that the front and rear chassis are non-movable with respect to each other.

In accordance with another aspect of the present disclosure, the forestry machine according to one or more of the preceding aspects may be configured so that the work tool is a tree processing member.

In accordance with another aspect of the present disclosure, the forestry machine according to one or more of the preceding aspects may be configured so that the work tool includes a grapple.

In accordance with another aspect of the present disclosure, the forestry machine according to one or more of the preceding aspects may be configured so that the work tool includes a feller head.

In accordance with another aspect of the present disclosure, the forestry machine according to one or more of the preceding aspects may be configured so that the engine is disposed in front of the cab with respect to the rear chassis portion.

In accordance with another aspect of the present disclosure, the forestry machine according to one or more of the preceding aspects may be configured so that the front chassis portion includes a lower surface extending forwardly from below the engine, and the lower surface is sloped upwardly as the lower surface extends forward.

In accordance with another aspect of the present disclosure, the forestry machine according to one or more of the preceding aspects may further include a drive gearbox at least partially disposed rearwardly of the cab with respect to the engine.

In accordance with another aspect of the present disclosure, the forestry machine according to one or more of the preceding aspects may be configured so that an uppermost and forwardmost edge of the forestry machine is disposed at a height so that the work tool of the work implement is movable into contact with ground below the forestry machine in front of the forestry machine when the work implement is in a fully extended position to forward direction.

In accordance with another aspect of the present disclosure, the forestry machine according to one or more of the preceding aspects may be configured so that the boom of the work implement is configured to be extendable to be substantially horizontal in front and on both sides of the forestry machine.

In accordance with another aspect of the present disclosure, the forestry machine according to one or more of the preceding aspects may be configured so that the ground propulsion apparatus includes at least two drive axles supported by the front chassis, the cab rotation axis is substantially perpendicular to the ground beneath the rotatable connection, and the cab rotation axis extends between the two drive axles.

In accordance with another aspect of the present disclosure, the forestry machine according to one or more of the preceding aspects may be configured so that the cab rotation axis is equally spaced from each of the two drive axles.

In accordance with another aspect of the present disclosure, the forestry machine according to one or more of the preceding aspects may be configured so that the cab rotation axis is non-movable relative to the front chassis such the cab not levelled even if the front chassis is on an inclined surface.

In accordance with another aspect of the present disclosure, the forestry machine according to one or more of the preceding aspects may be configured so that the engine is integrated into the front chassis in front of the cab rotation axis.

In accordance with another aspect of the present disclosure, the forestry machine according to one or more of the preceding aspects may be configured so that the engine is integrated into the front chassis in front of the rotatable connection.

Also, other objects, features, aspects and advantages of the disclosed work vehicle will become apparent to those skilled in the work vehicle field from the following detailed description, which, taken in conjunction with the annexed drawings, discloses one embodiment of the work vehicle.

BRIEF DESCRIPTION OF THE DRAWINGS

Referring now to the attached drawings which form a part of this original disclosure:

FIG. 7 is a reduced scale rear elevational view of the forestry machine illustrated in FIGS. 1-5, with the range of motion of the work implement illustrated in a region bounded by phantom lines (a mirror image of the region range of movement is also provided on the right side of the forestry machine);

FIG. 8 is a reduced scale left side elevational view of the forestry machine illustrated in FIGS. 1-5, with the range of motion of the work implement illustrated in a region bounded by phantom lines (the region is the same as on the right and left of the forestry machine of FIG. 7);

FIG. 11 is a right side elevational view of the forestry machine illustrated in FIG. 10, with the work implement range of motion illustrated by a series of phantom arcs and phantom lines for the purpose of illustration;

FIG. 12 is a partial left elevational view of the forestry machine illustrated in FIGS. 10-11, with the work implement extended in a rearwardly facing position in the wood bunk (like FIG. 4, wood bunk and rear not shown);

FIG. 13 is a partial top elevational view of the forestry machine illustrated in FIGS. 10-12, with the work implement extended in a rearwardly facing position in the wood bunk (like FIG. 5, wood bunk and rear not shown);

DETAILED DESCRIPTION OF THE EMBODIMENT(S)

Figure 1:
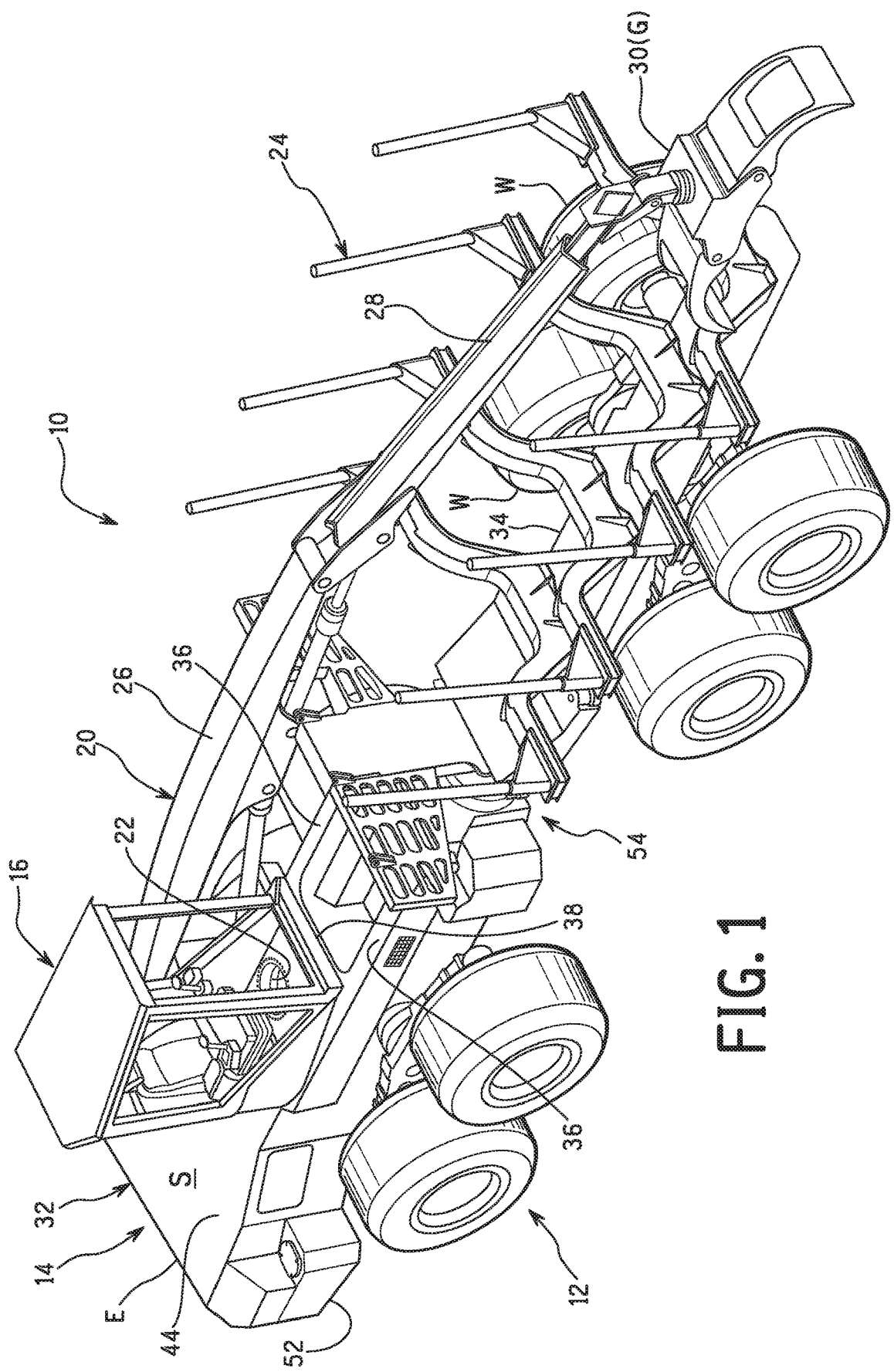
FIG. 1 is an upper, rear, left side perspective view of a forestry machine in accordance with a first embodiment.
Figure 2:
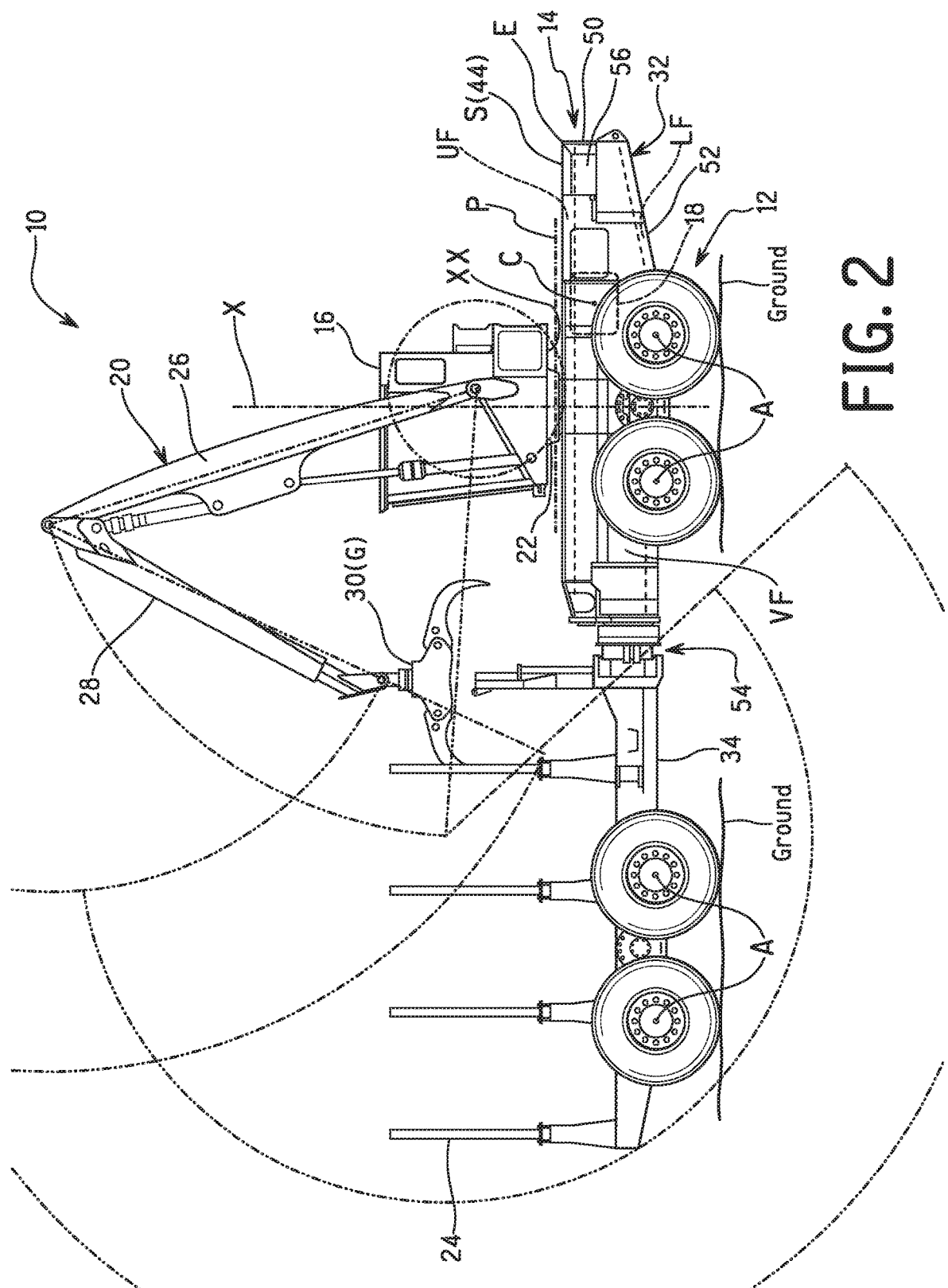
FIG. 2 is a right side elevational view of the forestry machine illustrated in FIG. 1, with the work implement range of motion illustrated by a series of phantom arcs and phantom lines for the purpose of illustration.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring initially to FIGS. 1-9, a forestry machine 10 is illustrated in accordance with a first illustrated embodiment. The forestry machine 10 includes a ground propulsion apparatus 12, a chassis 14 supported by the ground propulsion apparatus 12, a cab 16, an engine 18 (an example of a power supply) and a work implement 20. As explained below, the cab 16 is rotational about 360 degrees, the engine 18 (an example of a power supply) is preferably disposed below one or both of an upper most surface S of the chassis 14 and a rotational plane P of a rotatable connection 22 disposed between the chassis 14 and the cab 16. In the illustrated embodiment, the forestry machine 10 is a forwarder. In other words, in the illustrated embodiment, the work implement 20 has an attachment to move or forward cut trees, and a wood basket 24 is supported on the chassis 14 to receive the cut trees.

Figure 3:
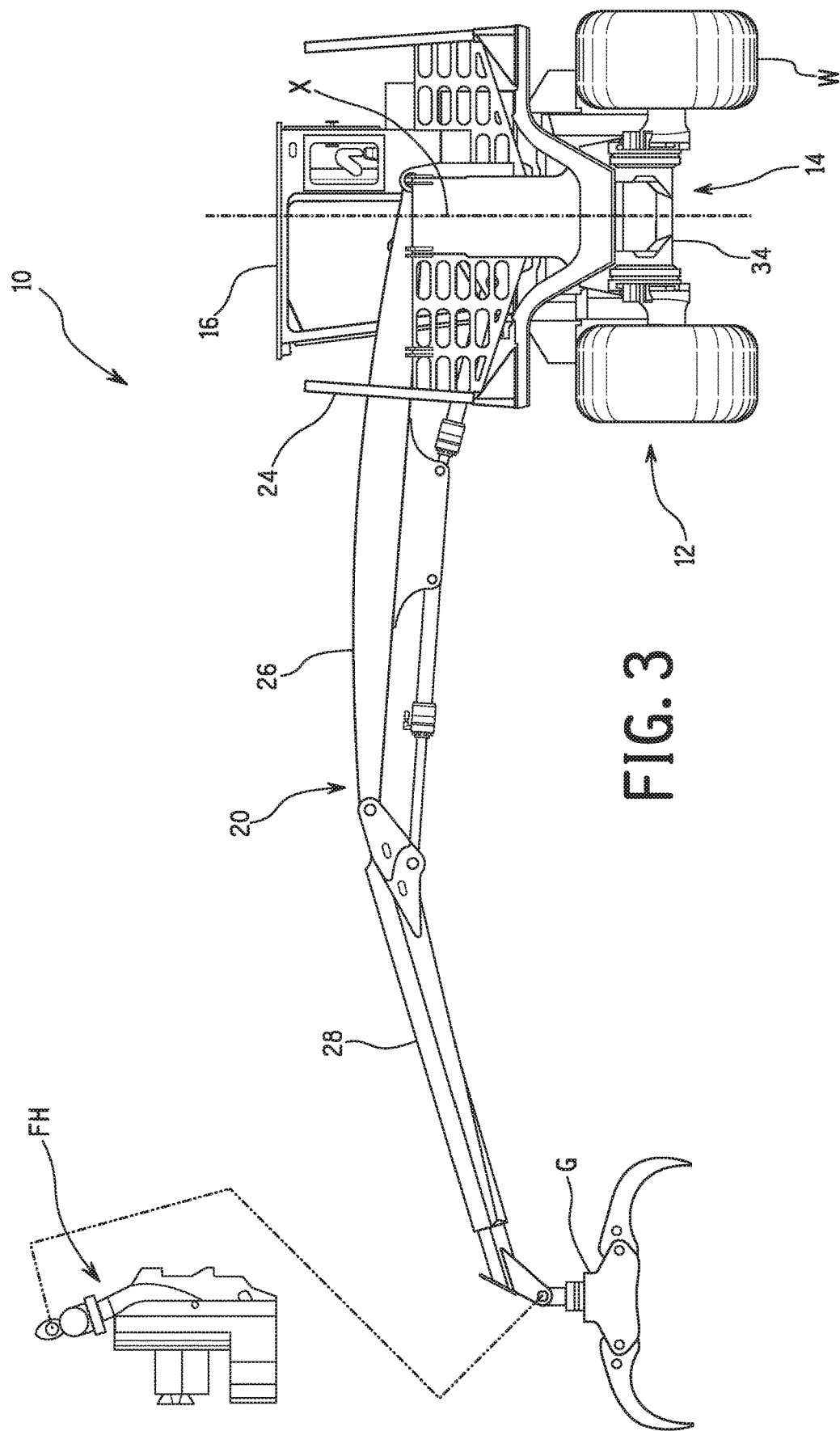
FIG. 3 is a rear elevational view of the forestry machine illustrated in FIGS. 1-2, with the work implement in an extended position, and with an alternate work tool (e.g., a harvester or feller head) illustrated in a detached position.
Figure 4:
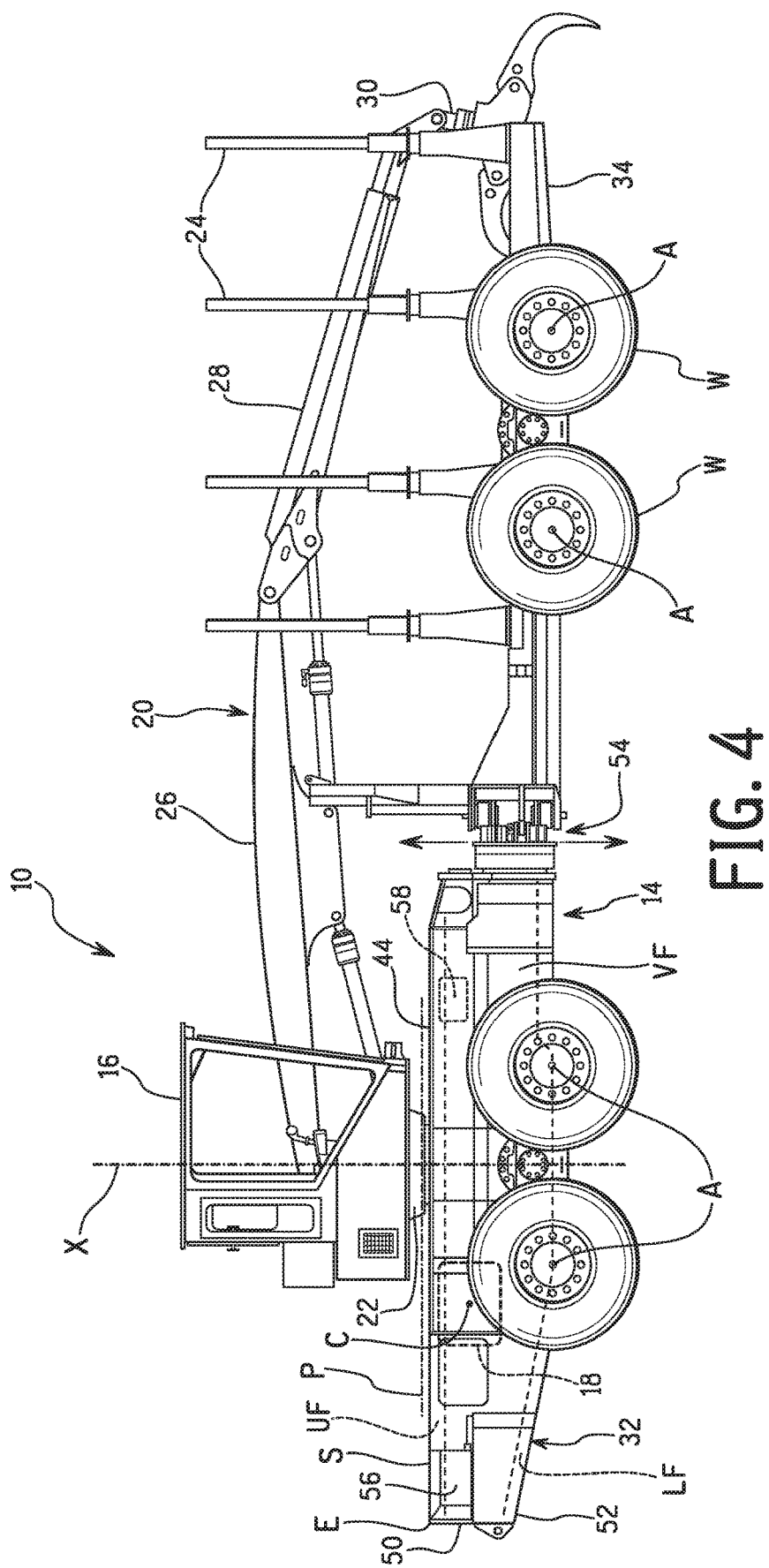
FIG. 4 is a left side elevational view of the forestry machine illustrated in FIGS. 1-3, with the work implement extended in a rearwardly facing position in the wood bunk.
Figure 5:
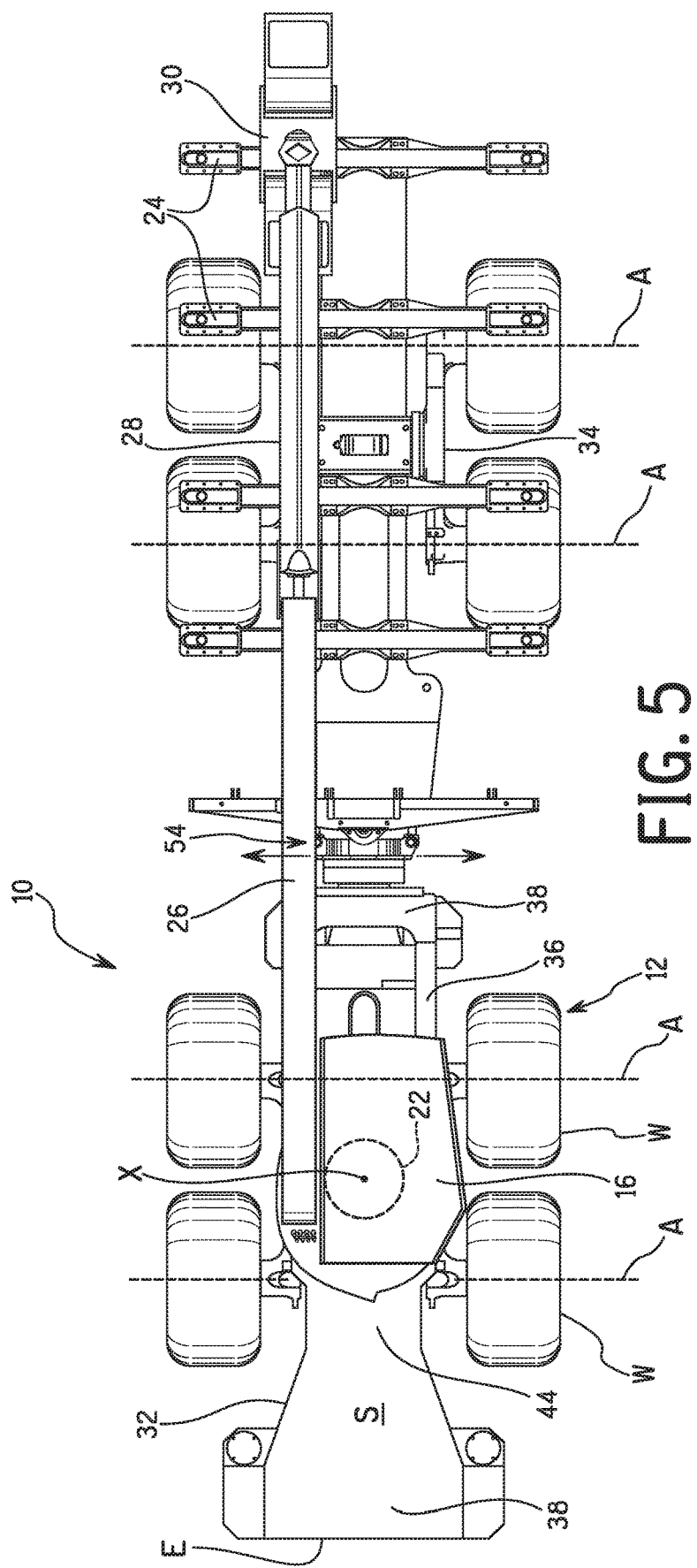
FIG. 5 is a top elevational view of the forestry machine illustrated in FIGS. 1-4, with the work implement extended in a rearwardly facing position in the wood bunk (like FIG. 4)
Figure 6:
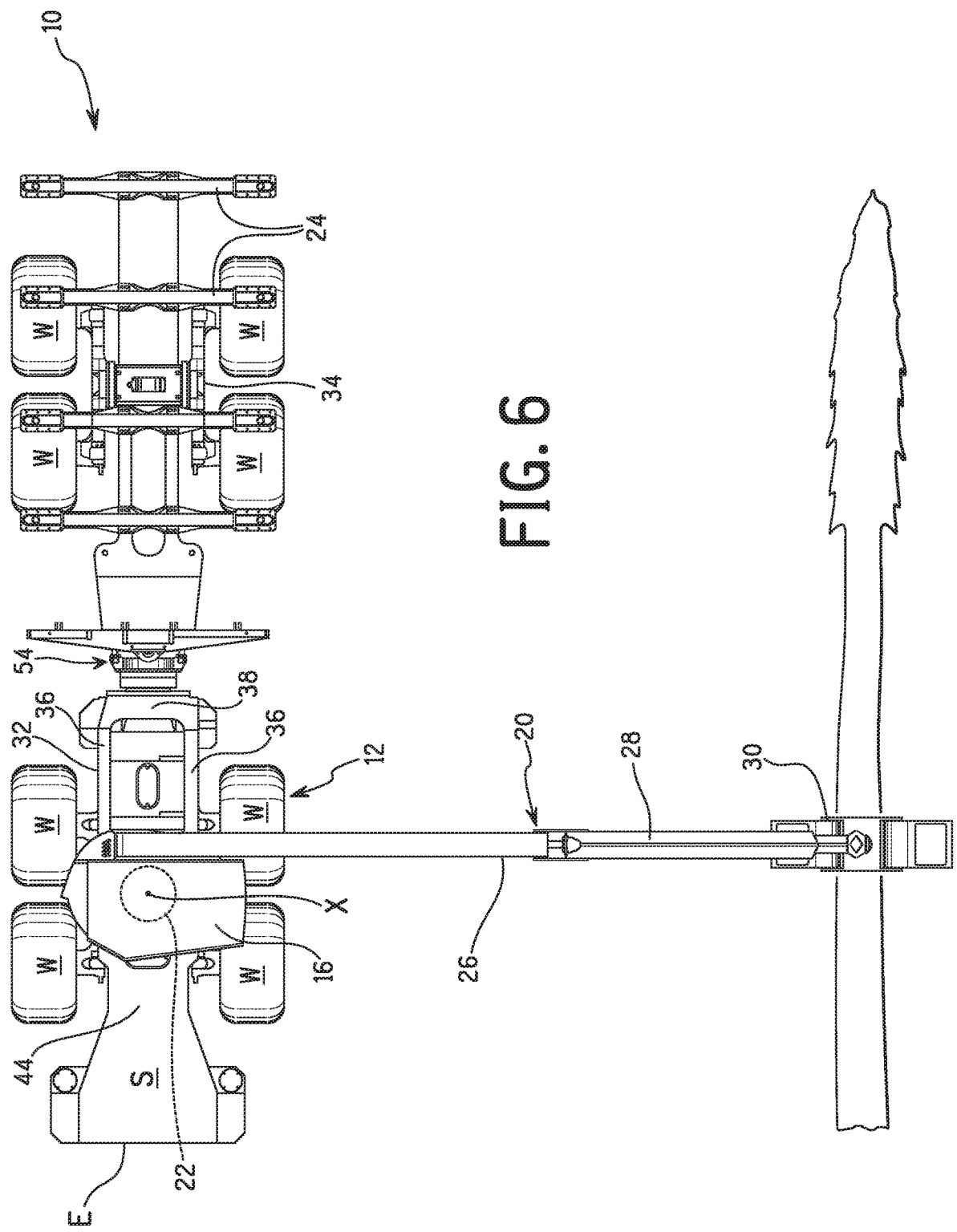
FIG. 6 is a reduced scale top elevational view of the forestry machine illustrated in FIGS. 1-5, with the work implement extended to the left side.
Figure 9:
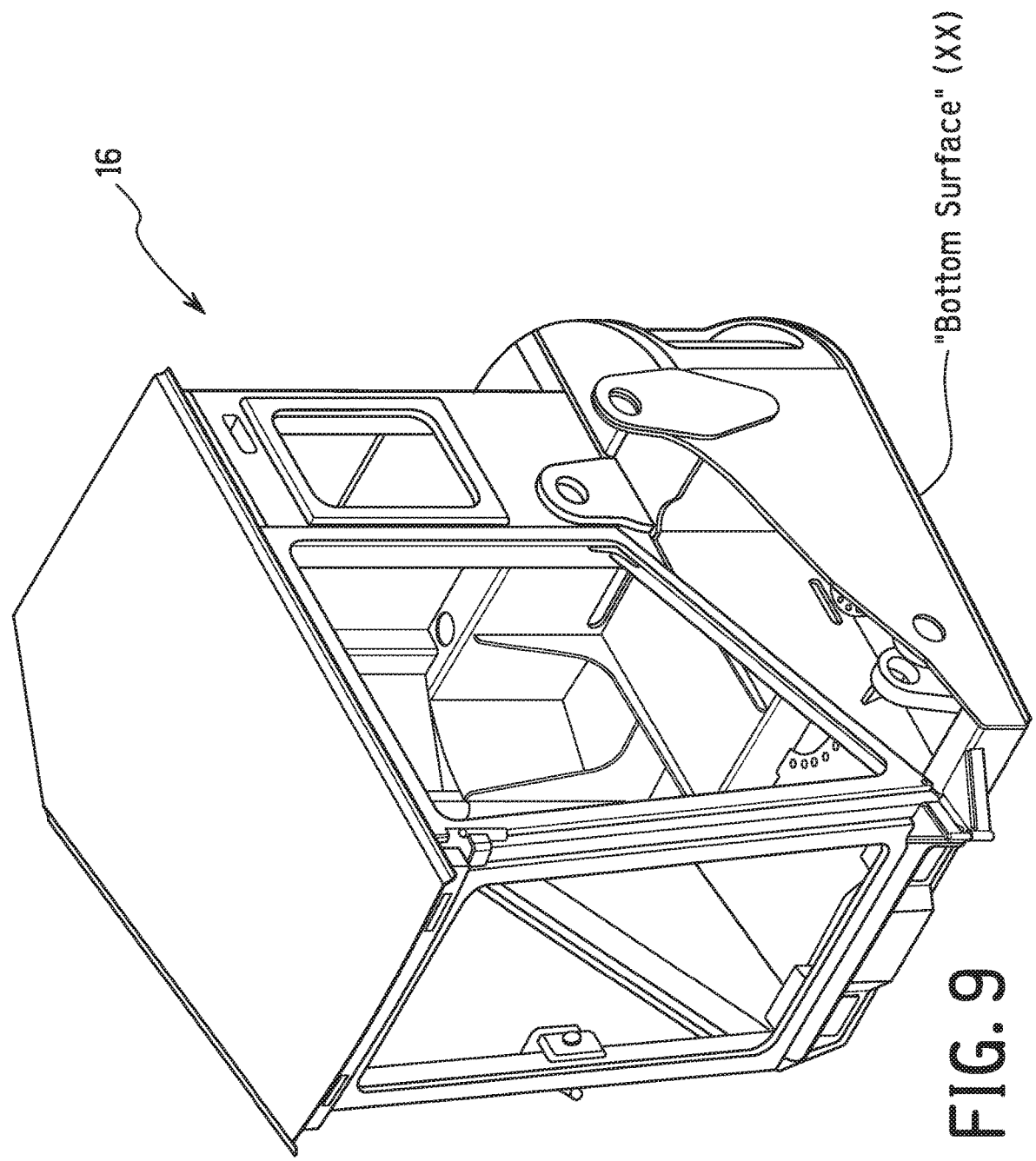
FIG. 9 is an enlarge perspective view of the cab of the forestry machine illustrated in FIGS. 1-8.
Figure 10:
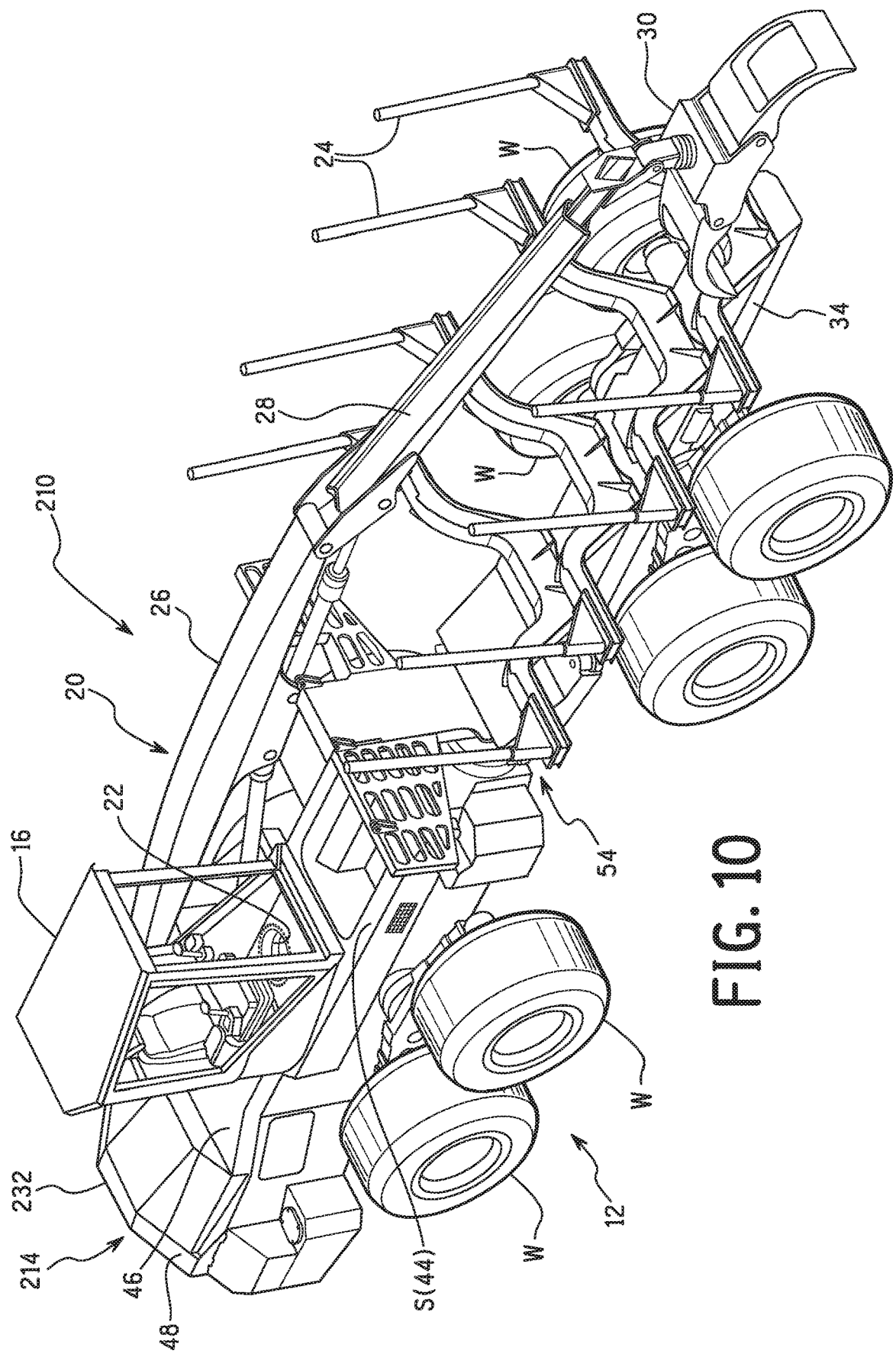
FIG. 10 is an upper, rear, left side perspective view of a forestry machine in accordance with a second embodiment.

In the illustrated embodiment, the forestry machine 10 is a wheeled work vehicle. Therefore, in the illustrated embodiment, the ground propulsion apparatus 12 has a plurality of wheels W to propel and maneuver the forestry machine 10 in a conventional manner. While the present invention may have particular advantages when used with a wheeled ground propulsion apparatus 12, it will be apparent to those skilled in the work vehicle field from this disclosure that the present invention is also applicable to tracked work vehicles in which the wheels are replaced by tracks. In the illustrated embodiment, the ground propulsion apparatus 12 includes at least two front drive axles A and at least two rear drive axles A, with each axle supporting a pair of wheels W. The axles A extend generally parallel to the ground below the wheels W Referring still to FIGS. 1-9, the work implement 20 is movably attached to the cab 16 to rotate therewith relative to the chassis 14. In the illustrated embodiment, the work implement 20 includes a boom 26, an arm 28 and a work attachment or work tool 30. In the illustrated embodiment, the work attachment or tool 30 is a grapple G or a feller head FH (two examples of tree processing members) as shown in FIG. 3. The boom 26 has a first portion movably attached to the cab 16 and a second portion attached to the arm 28. The arm 28 has a first portion movably attached to the boom 26 and a second portion with the work tool 30 attached thereto. A pivotal connection attaches the boom 26 to the arm 28 in a conventional manner. Because the work implement 20 is attached to the cab 16, the work implement 20 rotates with the cab 16. The work implement 20 is hydraulically controlled by an operator within the cab 16 in a conventional manner. The chassis 14 is supported by the ground propulsion apparatus 12 as mentioned above. The chassis 14 includes a front chassis portion 32 and a rear chassis portion 34. The front chassis portion 32 includes an upper portion UF and a lower portion LF coupled together by a vertical VF. The upper portion UF can also be considered an upper frame section or an upper plate section of the front chassis portion 32. Likewise, the lower portion LF can also be considered a lower frame section or a lower plate section of the front chassis portion 32. The cab 16 with the work implement 20 connected thereto is indirectly supported by the frames UF, LF and VF via the rotatable connection 22. The upper most surface S of the chassis 14 is formed on the upper portion UF. A lower most surface of the chassis is formed on the lower portion LF.

Figure 14:
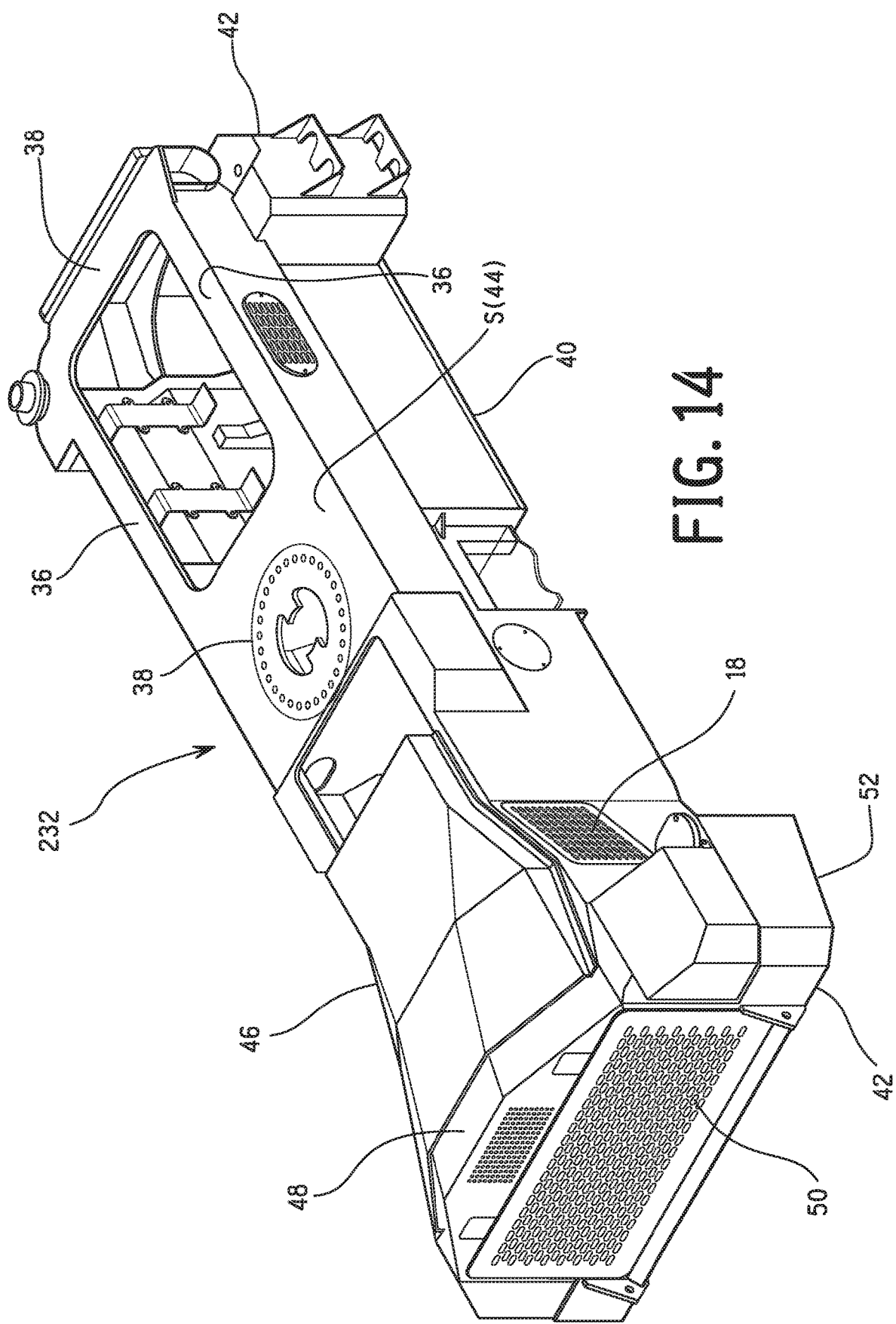
FIG. 14 is a perspective view of the frame of the front chassis portion illustrated in FIGS. 10-13, with a cover, bumper, grill and various other panels/covers attached thereto.
Figure 15:
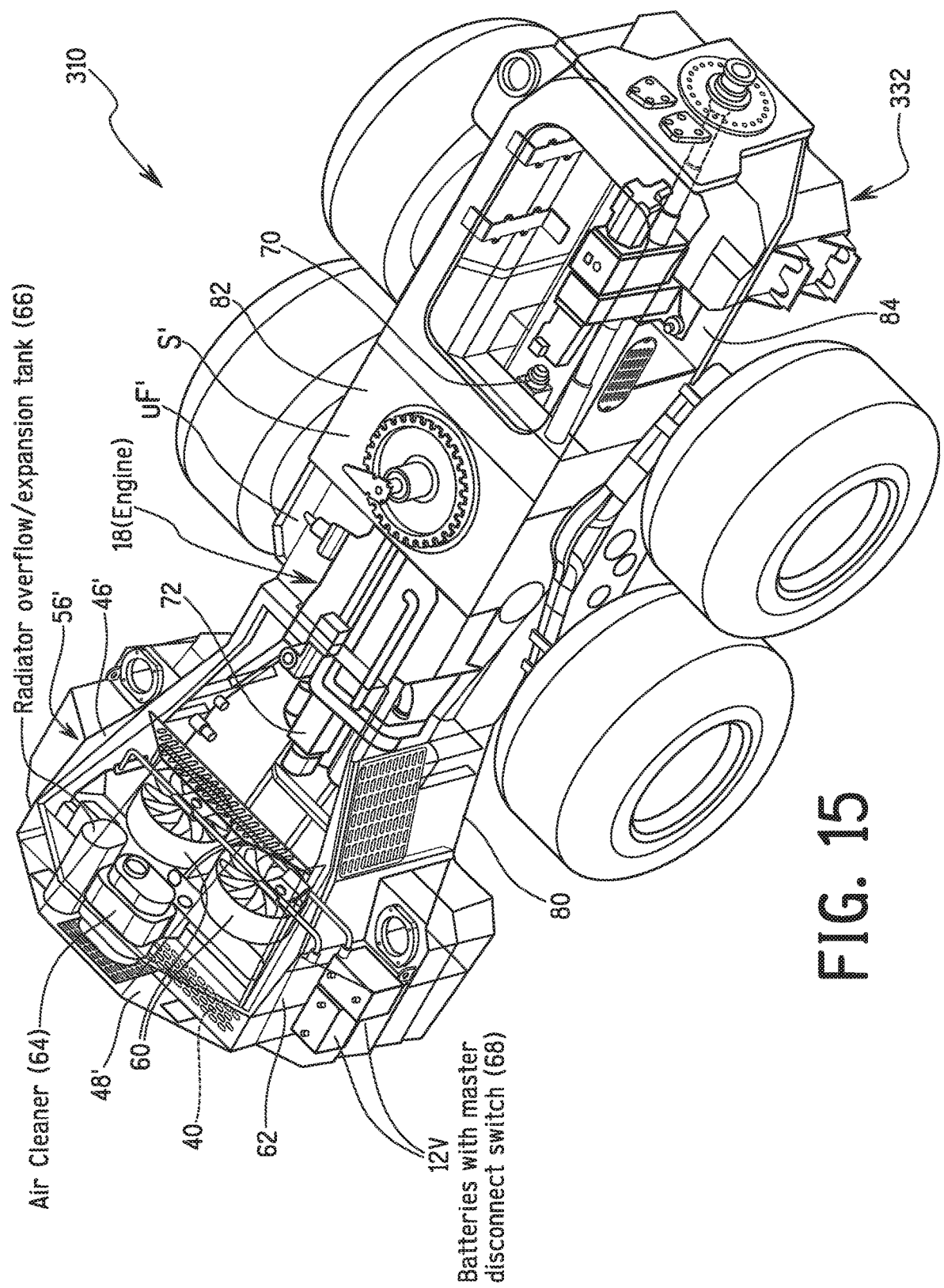
FIG. 15 is an upper, rear left perspective view of the front portion of a forestry machine in accordance with a third embodiment of the present invention, with the cab and work implement removed and portions broken away and/or shown transparently for the purpose of illustration.

The front chassis portion 32 will be explained in more detail. In the illustrated embodiment, the front chassis portion 32 includes the upper portion UF, the lower portion LF and the vertical portion VF as mentioned above. In the illustrated embodiment, the upper portion UF preferably includes a pair of longitudinally extending frame elements (for example, beams, rails or bars) 36 and at least two laterally extending frame elements 38 and upper plate elements. In the illustrated embodiment, there are three of the laterally extending frame elements 38, one at the front, one at the rear and one centrally located to support the rotatable connection 22. In the illustrated embodiment, the lower portion LF also preferably includes a pair of longitudinally extending frame elements (for example, beams, rails or bars) 40 and at least two laterally extending frame elements 42 and lower plate elements in a manner similar to the upper portion UF. The vertical portion VF can include a plurality of vertical elements, can be integrated with one or both of the upper portion UF and the lower portion LF, or can be a vertical plate member as illustrated herein. If the vertical portion VF is integrated with the upper portion UF and the lower portion LF, the frame elements 36 and 40 should have vertical heights sufficient so that the top of the frame elements 40 can be non-movably fixedly attached to the bottom of the frame elements 36. FIG. 14 shows the slightly modified version 232 of the front chassis portion 32, and can be referenced for better understanding of the front chassis portion 32. The front chassis portion 32, e.g., the upper portion UF, the lower portion LF, and vertical portion VF, can be constructed of bar/rail elements and/or plate elements. If constructed of plate elements reinforcing bars/rails can be provided at longitudinally extending corners and vertical corners to provide rigidity to the front chassis portion 32.

The upper portion UF, the lower portion LF and the vertical portion VF are preferably durable rigid metallic members or metallic plates such as steel members or steel plates or any other suitable material commonly used for forestry vehicle frame elements or plate elements. The typical materials and construction of individual frame members are well known in the art. Therefore, the upper portion UF, the lower portion LF and the vertical portion VF will not be discussed and/or illustrated herein, except for the configurations with respect to other elements as related to the present invention. As mentioned above, the cab 16 is rotatably supported on the front chassis portion 32 by the rotatable connection 22. The engine 18 is integrated into the front chassis portion 32 below the cab 16 in front of the rotatable connection 22. The front chassis preferably has other panels and elements coupled thereto, with the panels typically covering the functional elements, as explained below in more detail.

The rear chassis portion 34 has the wood basket 24 supported thereon. The rear chassis portion 34 will not be explained in further detail, except as related to the present invention. The rear chassis portion 34 supports the at least two rear drive axles A, with each having a pair of wheels mounted on opposite ends thereof.

Details of the front chassis portion 32 will now be explained in more detail. In the illustrated embodiment, the front chassis portion 32 is designed to have a low center of gravity and lower profile, which facilitates ground level maintenance. For example, the upper most surface S of the upper portion UF is preferably disposed lower than 6 feet off the ground so as to allow ground level maintenance. More preferably, the upper most surface S of the upper portion UF is disposed lower than 5 feet off the ground so as to allow ground level maintenance. Thus, the front chassis portion 32 also has an upper surface disposed lower than 6 feet off the ground so as to allow ground level maintenance. More preferably, this upper surface of the front chassis portion 32 is disposed lower than 5 feet off the ground so as to allow ground level maintenance. In the illustrated embodiment, the upper most surface of the upper portion UF is the upper surface of the front chassis portion 32. However, it will be apparent that an upper surface below the upper most surface S could be disposed low enough to permit ground level maintenance.

Regardless, in the illustrated embodiment, the front chassis 32 has a platform area 44 across a majority thereof with the platform area 44 being disposed below the rotational plane P of the rotatable connection 22. In the illustrated embodiment, the platform area 44 extends across the entire front chassis 32. The platform area 44 is on the upper surface S of the upper portion UF. Parts of this upper surface S can be covered by other elements such as a top cover 46 and a bumper 48 as discussed in the second embodiment (not shown in this embodiment. The bumper 48 can be disposed in front of the top cover 46 on the upper surface S. A front grill 50 is attached to a front of the front chassis portion 32 to allow airflow into a space disposed under the upper most surface S. In any case, the platform area 44 has a substantially flat upper surface corresponding to the upper surface S. The front chassis portion 32 includes a lower surface 52 extending forwardly from below the engine 18, and the lower surface 52 is sloped upwardly as the lower surface 52 extends forward. The lower surface is formed on the lower portion LF The front and rear chassis portions 32 and 34 are coupled together by an articulated joint 54 disposed therebetween. The articulated joint 54 has at least two degrees of freedom including a vertical direction (FIG. 4) and a pivotal direction (FIG. 5) around the vertical direction. The articulated joint 54 is lockable such that the front and rear chassis portions 32 and 34 are non-movable with respect to each other when the articulated joint is locked. The articulated joint 54 is conventional, and thus, will not be explained and/or illustrated in detail herein. The articulated joint 54 is typically unlocked to allow articulation during movement of the forestry machine 10 across the ground. On the other hand, the articulated joint 54 is typically locked when the forestry machine 10 is not moving across the ground and the work implement 20 is being used by the operator.

As mentioned above, the cab 16 is rotatably supported on the front chassis portion 32 for rotation about a cab rotation axis X to be selectively rotated 360 degrees. Preferably, the cab 16 is rotatably supported on the front chassis portion 32 by the rotatable connection 22 for rotation about the cab rotation axis X to be selectively rotated 360 degrees. The cab rotation axis X is substantially perpendicular to the ground beneath the rotatable connection 22, and the cab rotation axis 22 extends between the two drive axles. Thus, on a horizontal surface the cab rotation axis X will extend vertically and be disposed longitudinally in a front to back direction between the front drive axles A. In the illustrated embodiment, the cab rotation axis X is equally spaced from each of the two front drive axles A. In addition, in the illustrated embodiment, the cab rotation axis is non-movable relative to the front chassis portion 32 such the cab 16 is not levelled even if the front chassis portion 32 is on an inclined surface. Thus the cab 16 in the illustrated embodiment is non-levelling. The terms "levelling" and "non-levelling" are well known in the art. The cab 16 has a climate control system (not shown).

Referring still to FIGS. 1-9, in the illustrated embodiment, the engine 18 has a center of gravity C disposed below the upper most surface S of the upper portion UF. In addition, in the illustrated embodiment, the engine 18 preferably has the center of gravity disposed below the rotational plane P of the rotatable connection 22. The rotational plane P of the rotatable connection 22 passes through the rotatable connection 22 and the cab rotation axis X between a bottom of the cab 16 and the front a chassis portion 32. In addition, the engine 18 is preferably disposed in front of the cab 16 with respect to the rear chassis portion 34. Specifically, at least a part of the engine 18 is preferably disposed below the upper most surface S. More preferably, a majority of the engine 18 is disposed below the upper most surface S of the upper portion UF. More preferably, an entirety of the engine 18 is disposed below the upper most surface S of the upper portion UF. In addition, the entirety of the engine 18 is preferably disposed vertically between the uppermost surface S of the upper portion UF and a lower most surface 52 of the lower portion 34. In the illustrated embodiment, preferably, at least a portion of the engine 18 is disposed below the rotational plane P of the rotatable connection 22. More preferably, a majority of the engine 18 is disposed below the rotational plane P of the rotatable connection 22. More preferably, an entirety of the engine 18 is disposed below the rotational plane P of the rotatable connection 22. In addition, preferably that at least a part of engine 18 is disposed below a bottom surface (XX) of the cab 16. More preferably, a majority of the engine 18 is disposed below the bottom surface (XX) of the cab 16. More preferably, an entirety of the engine 18 is disposed below the bottom surface (XX) of the cab 16.

As mentioned above, the forestry machine 10, preferably includes additional components. For example, the forestry machine 10 preferably includes a cooling package 56 and a drive gear box 58. The cooling package 56 is disposed in front of the engine 18 with respect to the cab 16. The cooling package 56 is also preferably integrated into the front chassis portion 32 below the cab 16, like the engine 18. In fact, preferably, a majority of the cooling package 56 is disposed below the upper most surface S of the upper portion UF. More preferably, an entirety of the cooling package 56 is disposed at or below the upper most surface S of the upper portion UF. In the illustrated embodiment, preferably, a majority of the cooling package 56 is disposed below the rotational plane P of the rotatable connection 22. More preferably, an entirety of the cooling package 56 is disposed at or below the rotational plane P of the rotatable connection 22. In the illustrated embodiment, the engine 18 extends lower than the cooling package 56, and the cooling package 56 extends higher than the engine 18.

The drive gearbox 58 is preferably at least partially disposed rearwardly of the cab 16 with respect to the engine 18. Therefore, the drive gearbox 58 is also preferably disposed rearwardly of the rotatable connection 22. Thus, the engine 18 and the drive gearbox 58 are disposed on opposite sides of the rotatable connection 22. The drive gearbox 58 is connected to the engine 18 the ground propulsion apparatus 12 in conventional manner to transport the vehicle. Thus, hydraulics and hydraulic circuit(s) can be used in addition to mechanical connections. The drive gearbox 58 is also preferably integrated into the front chassis portion 32 below the cab 16, like the engine 18. The hydraulics are also preferably integrated into the front chassis portion 32. Openings and covers can be provided in the front chassis portion 32 to perform maintenance on the various components integrated therein. The openings and/or covers can be disposed on the lateral sides or on top (or even underneath possibly) of the front chassis portion 32.

It will be apparent to those skilled in the art from this disclosure that the forestry machine 10 includes additional components included therein, many integrated in the front chassis portion 32. Some of these components will be discussed below with reference to the third embodiment. The components of the third embodiment are also preferably included in the first and second embodiments. However, in this first embodiment, it will be understood that some components at the front of the front chassis portion 32 would have to be moved down. Some components will not be illustrated in this embodiment for the sake of brevity.

In the illustrated embodiment, both the upper surface S and the rotational plane P are used as location references for other components positions such as the engine 18 and the cooling package 56 (two examples). However, the locations of other elements are preferably such that they are positioned with respect to at least one of the upper surface S and the rotational plane P.

As best understood from FIGS. 1 and 7-8, an uppermost and forward most edge E of the forestry machine 10 is disposed at a height so that the work tool 30 of the work implement 20 is movable into contact with ground below the forestry machine 10 in front of the forestry machine 10 when the work implement 20 is in a fully extended position to forward direction such as FIG. 8. Thus, the work implement 20 preferably has a shaded range of movement in front of the forestry machine 10 no smaller than two both sides of the forestry machine 10. FIG. 7 shows a range of movement of the work implement 20 on the left side, but a mirror image shaded range of movement of the work implement 20 is also available on the right side of the forestry machine 10. Thus, the boom 26 of the work implement 20 is configured to be extendable to be substantially horizontal in front and on both sides of the forestry machine 10 such as FIG. 8.

In the illustrated embodiment, a separate counterweight is not needed. Rather the components of the forestry machine 10 can function as a counter weight components. For example, when the work implement 20 extends forwardly, the rear chassis portion 34 can act as a counter weight. In addition, because of the relatively lower center of gravity, less counter weight is needed. The forestry machine 10 as disclosed herein can be relatively lightweight, preferably less than 50,000 lbs, more preferably less than 40,000 lbs.

Second Embodiment

Referring now to FIGS. 10-14, a forestry machine 210 is illustrated in accordance with a second illustrated embodiment. The forestry machine 210 is identical to the forestry machine 10 of the first embodiment, except as explained and illustrated herein. Therefore, the descriptions and illustrations of the first embodiment also apply to this second embodiment, except as explained and illustrated herein.

The forestry machine 210 includes a modified front chassis portion 232. The front chassis portion 232 of this second embodiment is identical to the front chassis portion 32 of the first embodiment, except the platform area 44 is on the upper surface S of the upper portion UF that has parts covered by other elements such as the top cover 46 and a bumper 48. In addition, because these parts are covered, the upper surface S can have openings formed therein (not shown) to communicate with the cooling package 56, the engine or the like. The bumper 48 is disposed in front of the top cover 46 on the upper surface S. The front grill 50 is attached to a front of the front chassis portion 232 to allow airflow into a space disposed partially under the top cover 46 and the bumper 48. As mentioned above, the bumper 48 is mounted to the upper surface S at a front end of the front chassis portion 232 with respect to the cab 16.

Third Embodiment

Referring now to FIGS. 15-19, a front part of a forestry machine 310 is illustrated in accordance with a third illustrated embodiment. The forestry machine 310 is identical to the forestry machine 10 of the first embodiment, except as explained and illustrated herein. Therefore, the descriptions and illustrations of the first embodiment also apply to this second embodiment, except as explained and illustrated herein.

The forestry machine 310 includes a modified front chassis portion 332. The front chassis portion 332 is identical to the front chassis portion 32, except as explained and illustrated herein. Therefore, the descriptions and illustrations of the front chassis portion 32 of the first embodiments also apply to this third embodiment, except as explained and illustrated herein. The front chassis portion 332 of this third embodiment is similar to the second embodiment, except that a modified the upper surface S' slopes upwardly as it approaches a modified front bumper portion 48' of the front chassis portion 332. Therefore, a modified upper portion UF' of the front chassis portion 332 has a higher extending upper surface S', due to the incline, and a shallower top cover 46' and bumper 48' so that an overall height of this front chassis portion 332 is the same as the second embodiment. Therefore, the work implement 20 has the same range of movement of the second embodiment, which is at least equal to the ranges shown in FIGS. 7-8 of the first embodiment. In addition, like the second embodiment, a platform area 44' on the upper surface S' of the upper portion UF' has parts covered by other elements such as the slightly modified top cover 46" and bumper 48'. In addition, the upper surface S' can have openings formed therein to communicate with a cooling package 56', the engine or the like. The bumper 48' is disposed in front of the top cover 46' on the upper surface S'. The front grill 50 is attached to a front of the front chassis portion 332 to allow airflow into a space disposed partially under the top cover 46' and the bumper 48'. As mentioned above, the bumper 48' is mounted to the upper surface S' at a front end of the front chassis portion 332 with respect to the cab 16.

The locations of additional components are illustrated in FIGS. 15-18. Specifically, a more detailed view of the engine 18 and other components is provided. The engine 18 shown in FIGS. 15-18 is the same as the engine used in the first and second embodiments. In addition, the cooling 56' is taller than the cooling package 56 of the first embodiment due to the increased space. The cooling package 56' is also preferably used in the second embodiment. The cooling package 56' extends upwardly above the upper surface S' into the area below the bumper 48'. The cooling package 56' includes dual fans 60 with hydraulic fan motors and a radiator/oil cooler 62 disposed in front of the fans 60.

An air cleaner 64 and radiator overflow/expansion tank 66 are disposed above the cooling package 56'. A power module 68 including two 12 V batteries and a master disconnect switch is mounted in a left front compartment. A front axle differential input flange 70 is disposed in front of the drive gearbox 58. The drive gearbox 58 is a two speed wheel drive gear box powered by two hydrostatic motors. The front axle differential input flange 70 and the drive gearbox 58 cooperate so that the forestry machine 310 is all wheel drive and equipped with a differential lock system. The structure just in front of the engine 18 is a dual pump drive box 72 with implement pump and hydrostatic wheel pump. There are openings (coverable by covers, only some illustrated) to allow airflow and/or access to the various components in the front chassis portion 332. For example, the opening above the drive gearbox 58 allows access for mounting the components and for maintenance. Moreover, the opening above the engine 18 allows airflow from the radiator to escape as well as allows access for maintenance.

Figure 16:
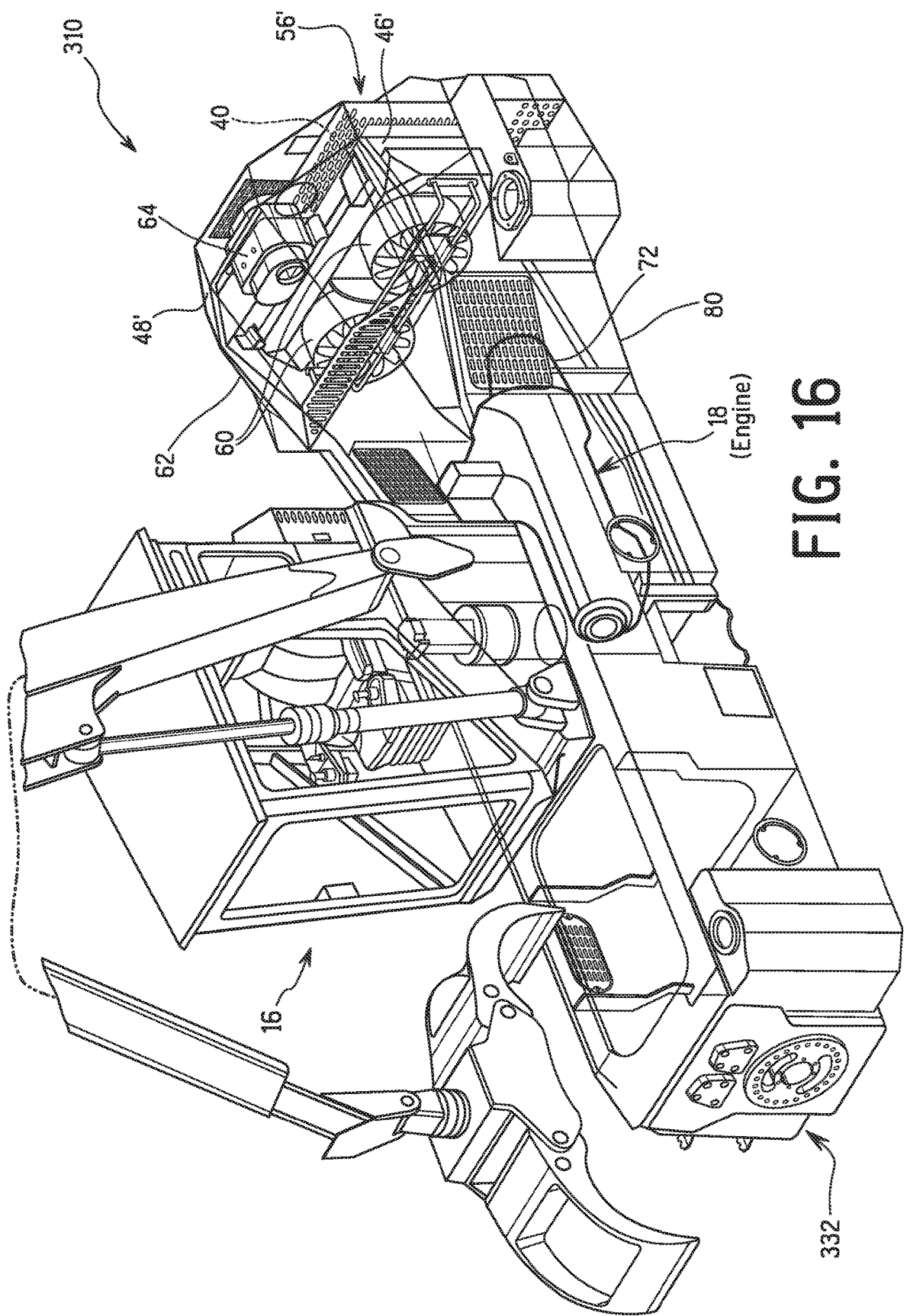
FIG. 16 is an upper, rear right perspective view of the front portion of a forestry machine illustrated in FIG. 15, with the cab and work implement attached but with portions broken away and/or shown transparently for the purpose of illustration.
Figure 17:
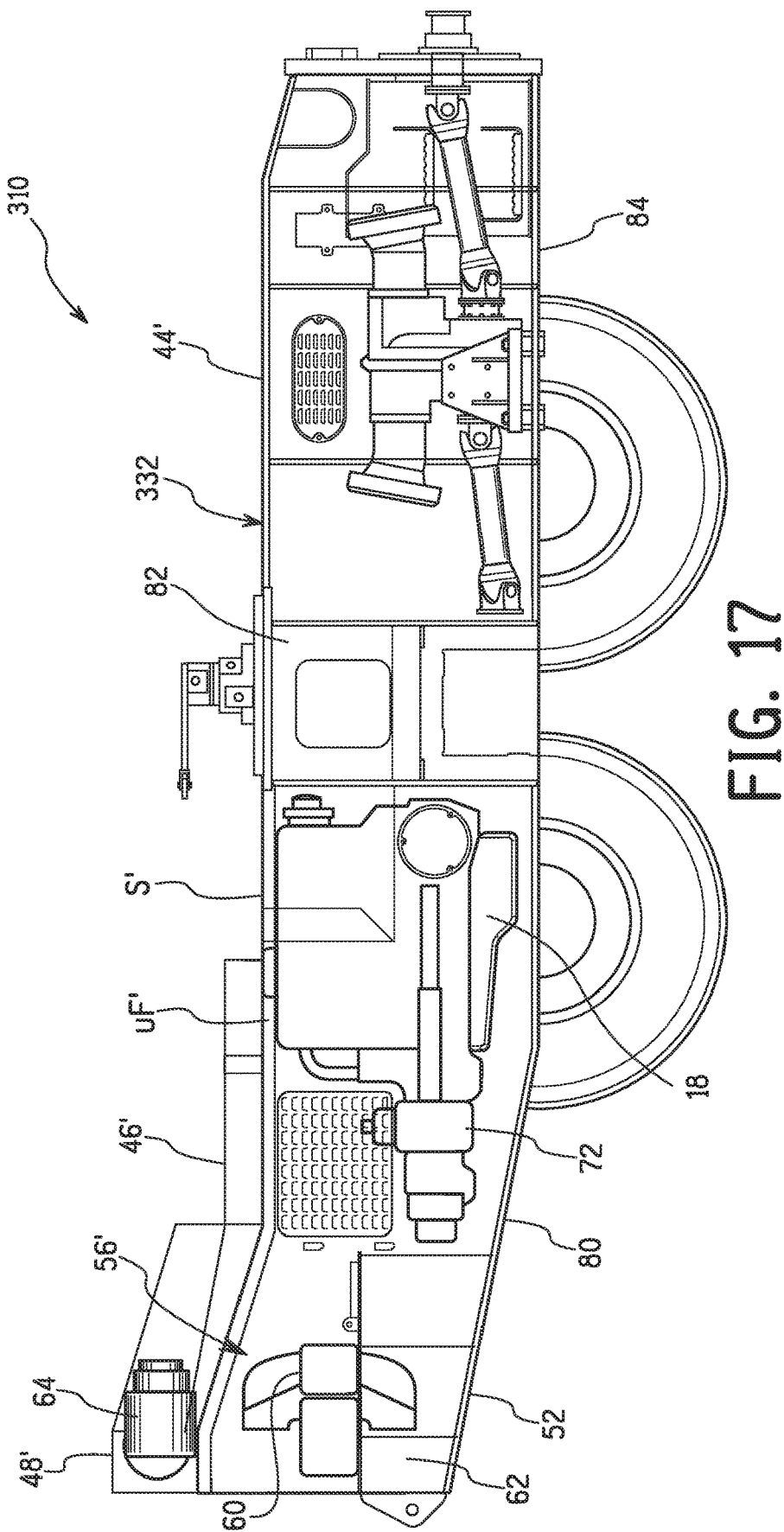
FIG. 17 is a left side perspective view of the front portion of the forestry machine illustrated in FIG. 15, with portions broken away and/or shown transparently for the purpose of illustration.
Figure 18:
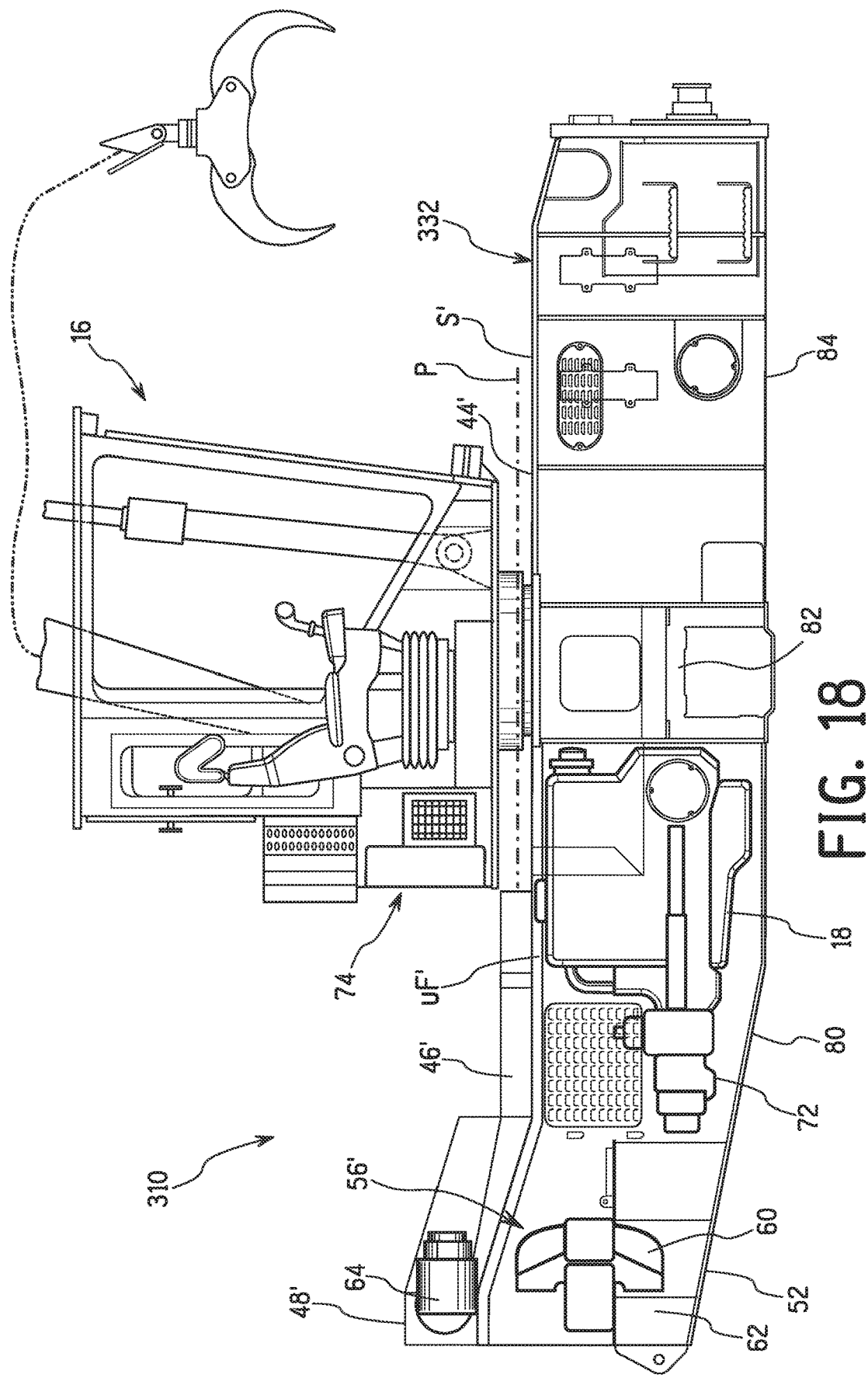
FIG. 18 is a left side perspective view of the front portion of the forestry machine illustrated in FIG. 16, with portions broken away and/or shown transparently for the purpose of illustration.

As shown in FIGS. 16 and 18, a compartment is provided in the cab 16 for a climate control system 74, which includes a heater and air conditioner. This system 74 is separate from the components in the front chassis portion 332. The second embodiment includes all of the components explained in this third embodiment in identical orientations. On the other hand, the first embodiment includes all of these components but may require a shorter cooling package 56 to have room for air cleaner and radiator overflow/expansion tank disposed above the cooling package 56. In addition, or alternatively, the cooling package in the first embodiment can be moved down and/or the air cleaner and/or radiator overflow/expansion tank can be relocated as needed.

Figure 19:
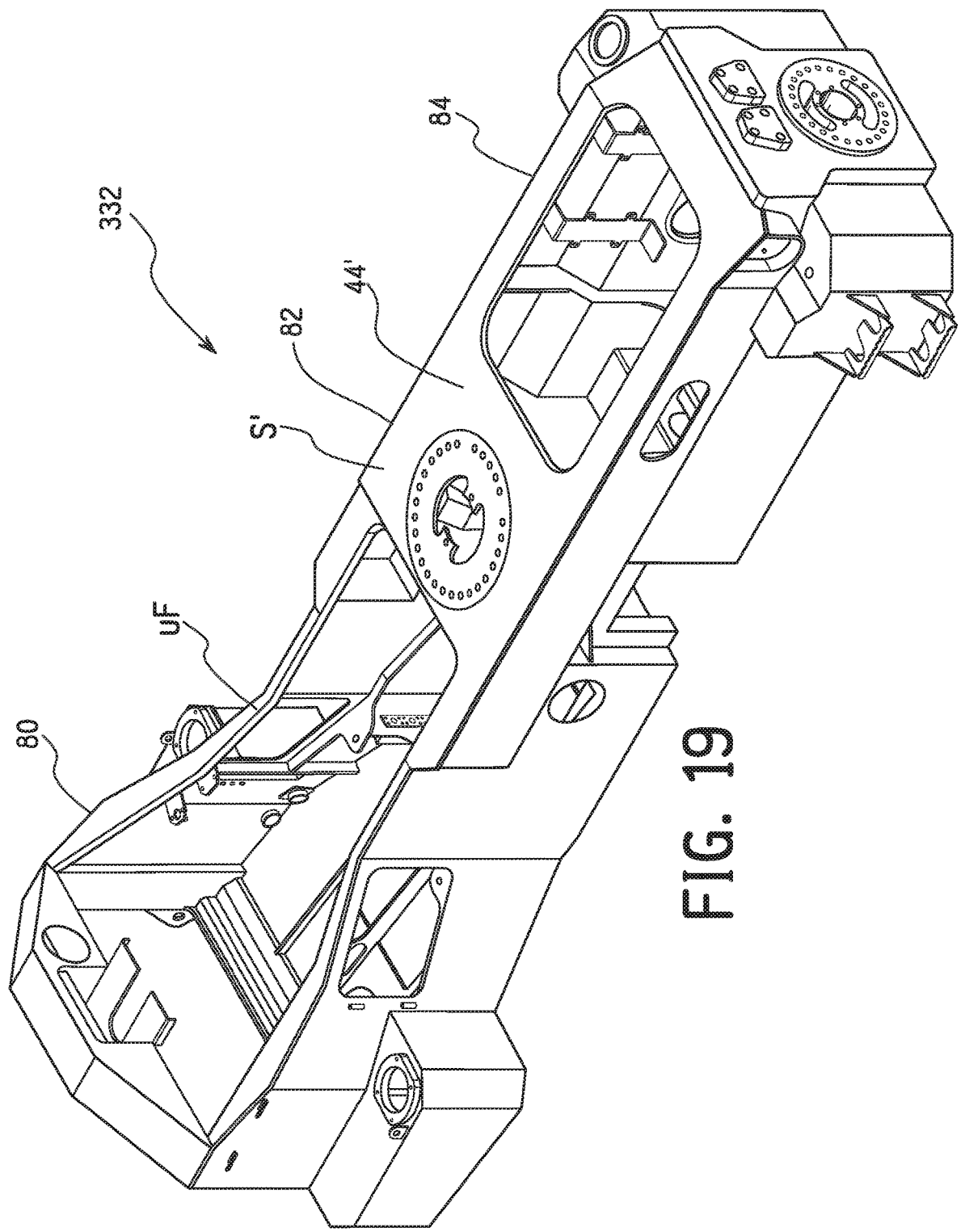
FIG. 19 is an upper perspective view of the front chassis portion of the forestry machine illustrated in FIGS. 15-18.

Referring now to FIG. 19, parts of the front chassis portion 332 will be briefly explained. The front chassis portion 332 in this embodiment includes three modules, a first or front module 80, a second or middle module 82 and a third or rear module 84. Each of the three modules is constructed of rigid plate materials that are rigidly, preferably fixedly, attached to each other. Then the three modules are rigidly, preferably fixedly, attached to each other to form the front chassis portion 332 shown and described in FIG. 19. As mentioned above, optionally, the front chassis portion 332 may include (not shown) longitudinal reinforcing rails disposed at the longitudinally extending corners. In additional, optionally the front chassis portion 332 can be constructed with rails or frame members as primary structural members with plates mounted thereto.

Many parts of the forestry machine are conventional components that are well known in the work vehicle field. Since these components are well known in the forestry machine field, these structures will not be discussed or illustrated in detail herein, except as related to the invention set forth in the following claims.

As used herein, the following directional terms "forward, rearward, above, downward, vertical, horizontal, below and transverse" as well as any other similar directional terms refer to those directions of a forestry machine on a level surface. The front chassis portion 32, 232, 332 is at a forward end while the rear chassis portion 34 is at a rearward end. Therefore, the part of the front chassis portion 32, 232, 332 remote from the rear chassis portion 34 is the forward end of the front chassis portion 32, 232, 332 with right and left sides extending from the part of the front chassis portion 32, 232, 332 remote from the rear chassis portion 34 rearwardly. Accordingly, these terms, as utilized to describe the present invention should be interpreted relative to a work vehicle equipped with the present invention. The terms of degree such as "substantially", "about" and "approximately" as used herein mean a amount of deviation of the modified term such that the end result is not significantly changed.

While only selected embodiments have been chosen to illustrate the present invention, it will be apparent to those skilled in the work vehicle field from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:
1. A forestry machine comprising:
   a ground propulsion apparatus;
   a chassis supported by the ground propulsion apparatus, the chassis including a front chassis portion and a rear chassis portion, and the rear chassis portion having a wood basket supported thereon;
   a cab rotatably supported on the front chassis portion by a rotatable connection about a cab rotation axis to be selectively rotated 360 degrees, the cab having a bot- tom with a lowermost rotatable surface of the cab facing the front chassis portion;

an engine integrated into the front chassis portion, an entirety of the engine being disposed below a rotational plane of the rotatable connection, and the rotational plane of the rotatable connection passing through the rotatable connection between the lowermost rotatable surface of the bottom of the cab and an uppermost non rotatable surface of the front chassis portion facing the cab; and a work implement movably attached to the cab above the rotational plane, the work implement including
a boom movably attached to the cab,
an arm movably attached to the boom, and
a work tool attached to the arm.

2. The forestry machine according to claim 1, further comprising:
a cooling package disposed in front of the engine with respect to the cab.

3. The forestry machine according to claim 2, wherein the cooling package is integrated into the front chassis portion below the cab.

4. The forestry machine according to claim 1, further comprising:
a bumper mounted to the uppermost surface at a front end of the front chassis portion with respect to the cab.

5. The forestry machine according to claim 1, wherein the engine is disposed in front of the cab with respect to the rear chassis portion.

6. The forestry machine according to claim 1, wherein the engine is integrated into the front chassis in front of the cab rotation axis.

7. The forestry machine according to claim 1, further comprising:
a drive gearbox at least partially disposed rearwardly of the cab with respect to the engine.

8. The forestry machine according to claim 1, wherein an uppermost and forwardmost edge of the forestry machine is disposed at a height so that the work tool of the work implement is movable into contact with ground below the forestry machine in front of the forestry machine when the work implement is in a fully extended position to forward direction.

9. The forestry machine according to claim 1, wherein the boom of the work implement is configured to be extendable to be substantially horizontal in front and on both sides of the forestry machine.

10. The forestry machine according to claim 1, wherein the front chassis portion has a platform area across a majority thereof with the platform area having the uppermost surface of the front chassis portion facing the cab.

11. The forestry machine according to claim 10, wherein the uppermost surface of the platform area is a substantially flat surface.

* * * * *